US008117403B2

(12) United States Patent
Heller, Jr. et al.

(10) Patent No.: US 8,117,403 B2
(45) Date of Patent: Feb. 14, 2012

(54) TRANSACTIONAL MEMORY SYSTEM WHICH EMPLOYS THREAD ASSISTS USING ADDRESS HISTORY TABLES

(75) Inventors: Thomas J. Heller, Jr., Rhinebeck, NY (US); Hung Qui Le, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 11/928,758

(22) Filed: Oct. 30, 2007

(65) Prior Publication Data
US 2008/0288730 A1    Nov. 20, 2008

Related U.S. Application Data

(63) Continuation-in-part of application No. 11/748,044, filed on May 14, 2007.

(51) Int. Cl.
*G06F 12/00* (2006.01)
*G06F 13/00* (2006.01)
(52) U.S. Cl. ........ 711/150; 711/100; 711/147; 711/154; 711/159
(58) Field of Classification Search .................. 711/100, 711/147, 150, 154
See application file for complete search history.

(56) References Cited

U.S. PATENT DOCUMENTS

| 3,686,641 | A |   | 8/1972  | Logan et al.   |     |
|-----------|---|---|---------|----------------|-----|
| 5,428,761 | A |   | 6/1995  | Herlihy et al. |     |
| 5,553,291 | A |   | 9/1996  | Tanaka et al.  |     |
| 5,701,432 | A |   | 12/1997 | Wong et al.    |     |
| 5,742,785 | A |   | 4/1998  | Stone et al.   |     |
| 5,946,711 | A |   | 8/1999  | Donnelly       |     |
| 5,963,922 | A |   | 10/1999 | Helmering      |     |
| 5,974,438 | A |   | 10/1999 | Neufeld        |     |
| 6,035,379 | A |   | 3/2000  | Raju et al.    |     |
| 6,052,695 | A | * | 4/2000  | Abe et al. ..............................  | 1/1 |
| 6,078,999 | A |   | 6/2000  | Raju et al.    |     |

(Continued)

FOREIGN PATENT DOCUMENTS

| EP | 1643371 A2      | 4/2006 |
|----|-----------------|--------|
| JP | 2006107494      | 4/2006 |
| WO | WO2007067390 A2 | 6/2007 |

OTHER PUBLICATIONS

Architectural Sematics for Practical Transactional Memory; McDonald et al.; Proceedings of the 33rd International Symposium on Computer Architecture; IEEE; Jun. 17, 2006-Jun. 21, 2006.*

(Continued)

*Primary Examiner* — Tuan V. Thai
(74) *Attorney, Agent, or Firm* — Cantor Colburn LLP; John Campbell

(57) ABSTRACT

A computing system uses specialized "Set Associative Transaction Tables" and additional "Summary Transaction Tables" to speed the processing of common transactional memory conflict cases and those which employ assist threads using an Address History Table and processes memory transactions with a Transaction Table in memory for parallel processing of multiple threads of execution by support of which an application need not be aware. Special instructions may mark the boundaries of a transaction and identify memory locations applicable to a transaction. A 'private to transaction' (PT-RAN) tag, directly addressable as part of the main data storage memory location, enables a quick detection of potential conflicts with other transactions that are concurrently executing on another thread of said computing system. The tag indicates whether (or not) a data entry in memory is part of a speculative memory state of an uncommitted transaction that is currently active in the system.

19 Claims, 21 Drawing Sheets

U.S. PATENT DOCUMENTS

| | | | |
|---|---|---|---|
| 6,360,220 | B1 | 3/2002 | Forin |
| 6,360,231 | B1 | 3/2002 | Pong et al. |
| 6,381,676 | B2 | 4/2002 | Aglietti et al. |
| 6,510,498 | B1 | 1/2003 | Hozle et al. |
| 6,611,906 | B1 | 8/2003 | McAllister et al. |
| 6,651,146 | B1 | 11/2003 | Srinivas et al. |
| 6,738,837 | B1 | 5/2004 | Wyland |
| 6,748,505 | B1* | 6/2004 | Dakhil ............................ 711/167 |
| 6,826,757 | B2 | 11/2004 | Steele, Jr. et al. |
| 6,862,664 | B2 | 3/2005 | Tremblay et al. |
| 6,874,065 | B1 | 3/2005 | Pong et al. |
| 6,880,045 | B2 | 4/2005 | Pong et al. |
| 6,880,071 | B2 | 4/2005 | Steele, Jr. et al. |
| 6,938,130 | B2 | 8/2005 | Jacobson et al. |
| 6,981,110 | B1 | 12/2005 | Melvin |
| 7,000,234 | B1 | 2/2006 | Shavit et al. |
| 7,017,160 | B2 | 3/2006 | Martin et al. |
| 7,039,794 | B2 | 5/2006 | Rodgers et al. |
| 7,089,374 | B2 | 8/2006 | Tremblay et al. |
| 7,107,402 | B1 | 9/2006 | Melvin |
| 7,117,502 | B1 | 10/2006 | Harris |
| 7,178,062 | B1 | 2/2007 | Dice |
| 7,187,062 | B2 | 2/2007 | Dice |
| 7,689,788 | B2 | 3/2010 | Moir et al. |
| 7,730,286 | B2 | 6/2010 | Petersen et al. |
| 7,865,701 | B1 | 1/2011 | Tene et al. |
| 2002/0072071 | A1 | 6/2002 | Kientsch-Engel et al. |
| 2002/0073071 | A1 | 6/2002 | Pong et al. |
| 2002/0078308 | A1 | 6/2002 | Altman et al. |
| 2002/0103804 | A1 | 8/2002 | Rothschild et al. |
| 2002/0143847 | A1* | 10/2002 | Smith ............................ 709/103 |
| 2002/0161815 | A1 | 10/2002 | Bischof et al. |
| 2002/0199069 | A1 | 12/2002 | Joseph |
| 2003/0066056 | A1 | 4/2003 | Petersen et al. |
| 2003/0079094 | A1 | 4/2003 | Rajwar et al. |
| 2003/0084038 | A1 | 5/2003 | Balogh et al. |
| 2003/0204682 | A1 | 10/2003 | Ueno |
| 2004/0015642 | A1 | 1/2004 | Moir et al. |
| 2004/0034673 | A1 | 2/2004 | Moir et al. |
| 2004/0152948 | A1 | 8/2004 | Kim |
| 2004/0162948 | A1 | 8/2004 | Tremblay et al. |
| 2004/0187115 | A1 | 9/2004 | Tremblay et al. |
| 2004/0187116 | A1 | 9/2004 | Tremblay et al. |
| 2004/0187127 | A1* | 9/2004 | Gondi et al. ............... 718/100 |
| 2004/0267828 | A1 | 12/2004 | Zwilling |
| 2005/0060559 | A1 | 3/2005 | McKenney |
| 2005/0086446 | A1 | 4/2005 | McKenney et al. |
| 2005/0097296 | A1* | 5/2005 | Chamberlain et al. ........ 711/170 |
| 2005/0131947 | A1* | 6/2005 | Laub et al. ................. 707/104.1 |
| 2005/0138298 | A1* | 6/2005 | Downer ........................ 711/148 |
| 2005/0216625 | A1* | 9/2005 | Smith et al. .................... 710/100 |
| 2006/0085588 | A1 | 4/2006 | Rajwar et al. |
| 2006/0085591 | A1 | 4/2006 | Kumar et al. |
| 2006/0173885 | A1 | 8/2006 | Moir et al. |
| 2006/0200632 | A1 | 9/2006 | Tremblay et al. |
| 2006/0206692 | A1 | 9/2006 | Jensen |
| 2006/0212456 | A1 | 9/2006 | Earhart |
| 2006/0282476 | A1 | 12/2006 | Dolby et al. |
| 2006/0288173 | A1 | 12/2006 | Shen |
| 2006/0294326 | A1* | 12/2006 | Jacobson et al. ............. 711/156 |
| 2007/0028056 | A1 | 2/2007 | Harris |
| 2007/0028058 | A1 | 2/2007 | Harris |
| 2007/0186056 | A1 | 8/2007 | Saha et al. |
| 2007/0239942 | A1 | 10/2007 | Rajwar et al. |
| 2007/0282838 | A1 | 12/2007 | Shavit et al. |
| 2007/0300238 | A1 | 12/2007 | Kontothanassis et al. |
| 2008/0022054 | A1* | 1/2008 | Hertzberg et al. ............ 711/152 |
| 2008/0065864 | A1 | 3/2008 | Akkary et al. |
| 2008/0098181 | A1* | 4/2008 | Moir et al. ................... 711/152 |
| 2008/0288727 | A1 | 11/2008 | Baum et al. |
| 2008/0288730 | A1 | 11/2008 | Heller, Jr. et al. |

OTHER PUBLICATIONS

Architectural Support for Software Transactional Memory; Saha et al; 39th Annual IEEE/ACM International Symposium on Microarchitecture; Dec. 9, 2006-Dec. 13, 2006.*

LogTM: Log-based Transactional Memory; Moore et al; HPCA; 2006 12th International Symposium on High-Performance Computer Architecture; Feb. 11, 2006-Feb. 15, 2006.*

Virtualizing Transactional Memory; Rajwar et al.; Proceedings of the 32nd International Symposium on Computer Architecture; IEEE; Jun. 4, 2005-Jun. 8, 2005.* java.lang Class Thread; Sun Microsystems; Apr. 5, 2003.*

Subject Matter Eligibility Test (M-or-T) for Process Claims; USPTO.*

McRT-STM: A High Performance Software Transactional Memory System for a Multi-Core Runtime; Saha et al.; PPoPP '06; ACM; Mar. 29, 2006-Mar. 31, 2006.*

Computer Architecture: A Quantitative Approach (Third Edition), p. 530; Hennessy et al.; published 2003.*

Unbounded Transactional Memory; Ananian et al.; 11th International Symposium on High-Performance Computer Architecture; IEEE; Feb. 11, 2005-Feb. 15, 2005.*

MATE: Micro Assist Thread Engine; IPCOM000027405D; IBM; Apr. 7, 2004.* java.lang Class Thread; Sun Microsystems; Apr. 5, 2003.*

The Advantages of Multithreaded Applications; Kerns, Tamra; copyright 1998.*

Architecture Diagram of the Celeron Willamette; Schmid, Patrick; Tom's Hardware; Jun. 12, 2002.*

Grinberg et al; "Investigation of Transacional Memory Using FPGAs", School of Electrical Engineering, Tel Aviv University, Tel Aviv Israel, pp. 1-4.

Harris et al. "Transactional Memory with Data Invariants", pp. 1-12.

Shriraman et al. "Hardware Acceleration of Software Transactional Memory", May 18, 2006, pp. 1-10.

Chung et al. "Tradeoffs in Transactonal Memory Virtualization", ASPLOS '06 Oct. 21-25, 2006, pp. 1-12.

"THREAD: (Computer Science)" Wikipedia, http://en.wikipedia.org/wiki/Thread_(computer_science), pp. 1-7.

Wood, "Transactional Memory—An Oveview of Hardware Alternatives", Transactional Memory Workshop, Apr. 8, 2005, pp. 1-22.

Soltis, "Inside the AS/400", 2nd Edition, Duke Press, pp. 1-8.

Katz et al. Implementing a Cache Consistency Protocol, Research Paper, Electrical Engineering and Computer Science Department. University of California Berkely. pp. 1-31.

Banatre et al., "Cache Management in a Tighily Coupled Fault Tolerant Multiprocessor", 1990 IEEE, pp. 1-8.

"Securing Your Future with HP: A Transition Guide for Tru64 UNIX Customers", http://whitepapers.techrepublic.com.com/whitepaper.aspx?docID=275665&promo=100510, pp. 1-3.

"Native POSIX Thread Library", http://en.wikipedia.org/wiki/Native_POSIX_Thread_Library, pp. 1-3.

"Software Transactional Memory", Wikipedia, http://wikipedia.org/wiki/Software_transactional_memory, pp. 1-6.

Dice et al., "Transactional Locking II", pp. 1-15.

"Prograrrniming in the Age of Concurrency: Software Transactional Memory", http://channel9.msdn.com/Showpost.aspx?postid=231495, pp. 1 -17.

Herlihy et al. "Transactional Memory: Architectural Support for Lock-Free Data Structures", 1993 IEEE, pp. 289-300.

Herlihy "What Can We Prove About Transactional Memory?", Brown University. pp. 1-67.

Rajwar et al "Speculative Lock Elision: Enabling Highly Concurrent Multithreaded Execution", 2001 IEEE, pp. 294-305.

Mohamed "The Posix Interface for the Unicon Programming Language," http://www.drones.com/unicon/, pp. 1-21.

Wheeler "Secure Programmer: Prevent Race Conditions", http://www-128.ibm.com/developerworks/linux.library/1-sprace.html, pp. 1-10.

"Multithreaded Programming Guide Products and Services", http://docsun.cites.uluc.edu/sun_docs/C/solaris_9/SUNWdev/MTP/p56.html, pp. 1-4.

"Multithreaded Programming Guide" http://docs.sun.com/app.docs/doc/806-6867/6jfpgdcop?1=sv&s=view, pp. 1-13.

"Writing Multithreaded Java Applicatons", http://www-128.ibm.com/developerworks/java/library/j-thread.html, pp. 1-7.

Lee "The Problem with Threads", Innovative Technology for Computing Professionals, May 2006. pp. 1-19.

Kongetira et al "Niagara: A 32-Way Multithreaded Sparc Processor", 2005 IEEE, pp. 21-29.
Rajwar et al. "Virtualizing Transactional Memory", pp. 1-12.
Ananian et al. "Unbounded Transactional Memory", Research Abstracts 2006, CSAIL Publications and Digital Archive, pp. 1-4.
Hammond et al. "Transactional Memory Coherence and Consistency", Stanford University, pp. 1-12.
"Tuple Space", http://c2.com/cgi/wiki?TupleSpace, pp. 1-5.
McDonald et al. "Architectural Semantics for Practical Transactional Memory", Computer Systems Laboratory Stanford University, pp. 1-12.
Kuszmaul et al. "Transactions Everywhere", http://cs.wisc.edu/~rajwar/tm-workshop/position_statements.htm, pp. 1-19.
L.C. Heller et al. "Millicode in an IBM zSeries Processor"; IBM Journal of Research & Development, vol. 48, No. 3/4, May/Jul. 2004, pp. 425-434.
Moore, Kevin et al., LogTM: Log Based Transactional Memory, Feb. 15, 2006, 12th Annual International Symposium on High Performance Computer Architecture (HPCA-12) Cited in U.S. Appl. Nos. 11/748,044;11/928,533; 111928,594; 11/928,661; 111928,758.
Rajwar et al; Vidualizing Transactional Memory; Proceedings of 32nd International Symposium on Computer Arcvhtecture; IEE Jun. 4, 2005-Jun. 8, 2005 Cited in U.S. Appl. No. 11/928,594.
Ananian et al; Unbounded Transactional Memory; 11th International Symposium on High-Performance Computer Architecture; IEEE; Mar. 7, 2005; Cited in U.S. Appl. No. 11/928,661.
Saha et al; Architectural Support for Software Transactional Memory; 39th Annual IEEE?ACM International Symposium on Microarchitecture; Dec. 9, 2006 Dec. 13, 2006 Cited in U.S. Appl. No. 11/928,758.
McDonald et al; Architectural Sematics for Practical Transactional Memory; Proceedings of the 33rd International Symposium on Computer Architecture; IEEE; Jun. 17, 2006-Jun. 21, 2006 Cited in U.S. Appl. No. 11/928,758.
Saha et al; McRT-STM; A High Performance Software Transactional Memory System for a Multi-Core RUntime; PPoPP '06; ACM Mar. 29, 2006-Mar. 31, 2006 Cited in U.S. Appl. No. 11/928,758.
Mate: Micro Assist Thread Engine; IP)C)M00027405D; IBM; Apr. 7, 2004 Cited in U.S. Appl. No. 11/928,758.
"Securing Your Future with HP: A Transition Guide for Tru64 UNIX Customers", http://whitepapers.techrepublic.com.com/whitepaper. aspx?docid=2756658&promo=100510, pp. 1-3.
"Native POSIX Thread Library", http://en.wikipedia.org/wiki/Native_POSIX_read_Library, pp. 1-3.
"Software Transactional Memory", Wikipedia, http://wikipedia.org/wiki/Software_transactional_memory pp. 1-6.
"Programming in the Age of Concurrency: Software: Software Transactional Memory", http://channe19.msdn.com/Showpost.aspx?postid=231495, pp. 1-7.
"Multithreaded Programming Guide Products and Services", http://docsun.cites,uiuc.edu/sun_docs/Cisolaris_9/SUNWdev/MTP/p56.html, pp. 1-4.
"Multithreaded Programming Guide" http://docs.sun.com/app.docs/doc/806-6867/6jfpgdcop?1=sv&a=view, pp. 1-13.
"Writing Multithreaded JAVA Applications", http://www-128.ibm,com/developworks/java/library/j-thread.html, pp. 1-7.
"Tuple Space", http://c2.com/cgi/wiki?TupleSpace, pp. 1-5.
Ananian et al, "Unbounded Transactional Memory", Research Abstracts 2006, CSAIL Publications and Digital Archive, pp. 1-4.
Banatre et al., "Cache Management in a Tightly Coupled Fault Tolerant Multiprocessor", 1990 IEEE. pp. 1-8.
Chung et al. "Tradeoffs in Transactional Memory Virtualization", ASPLOS '06 Oct. 21-25, pp. 1-12.
Dice et al., "Transactional Locking II", pp. 1-15.
Grinberg et al; "Investigation of Transactional Memory using FPGAs", School of Electrical Engineering, Tel aviv University, Tel Aviv Israel, pp. 1-4.
Hammond et al, "Transactional Memory Coherence and Consistency", Stanford University, pp. 1-12.
Harris et al. "Transactional Memory with Data Invariants", pp. 1-12.
Herlihy "What Can We Prove About Transactional Memory?" Brown University, pp. 1-67.
Herlihy et al "Transactional Memory; Architectural Support for Lock-Free Data Structures", 1993 IEEE, pp. 289-300.
Katz et al. "Implementing a Cache Consistency Protocol, Research Paper, "Electrical Engineering and Computer Science Department, University of California Berkeley, pp. 1-31.
Kongetira et al. "Niagara: A 32-Way Multithreaded Sparc Processor", 2005 IEEE, pp. 21-29.
L.C. Heller et al., "Millicode in an IBM zSeries Processor"; IBM Journal of Research and development, vol. 48, No. 3/4, May/Jul. 2004, pp. 425-434.
Lee, "The Problem with Threads", Innovative Technology for Computing Professionals, May 2006, pp. 1-19.
McDonald et al, "Architectural Semantics for Practical Transactional Memory", Computer Systems Laboratory Stanford University, pp. 1-12.
Mohamed "The Posix Interface for the Unicon Programming Language", http://www.drones.com/unicon, pp. 1-21.
Moore et al., LogTM: Log-Based Transactional Memory, Feb. 15, 2006, 12th Annual International Symposium on High Performance Computer Architecture (HPCA-12).
Rajwar et al., "Virtualizing Transactional Memory", pp. 1-12.
Rajwar et al. "Speculative Lock Ellision: Enabling Highly Concurrent Multithreaded Exectuion", 2001 IEEE, pp. 294-305.
Shriraman et al. "Hardware Acceleration of Software Transactional Memory", May 18, 2006, pp. 1-10.
Soltis, "Inside the AS/400", 2nd Edition, Duke Press, pp. 1-6.
"THREAD: (Computer Science)" Wikipedia, htt://en.wikipedia.org/wiki/Thread_(computer_science), pp. 1-7.
Wheeler "Secure Programmer: Prevent Race Conditions", http://www-128.ibm.com/developerworks.linux/library/1-sprace.html, pp. 1-10.
Wood, "Transactional Memory—An Overview of Hardware Alternatives", Transactional Memory Workshop, Apr. 8, 2005, pp. 1-22.
Yen et al, LogTM-SE Decoupling Hardware Transactional Memory from Caches, Feb. 14, 2007, 13th Annual International Symposium on High Performance Computer Architecture, cited in U.S. Appl. No. 11/748,044.
Advantage Set Associativity; Computer Architecture: a Quantitative Approach, 3rd Edition, Published 2003—Hennessy et al. p. 429—Cited by Examiner in U.S. Appl. No. 11/928,594.
Definition of Set Associative Cache; FOLDOC—Cited by Examiner in U.S. Appl. No. 11/928,594; Oct. 18, 2004.
Definition of Virtual Memory—FOLDOC—Cited in U.S. Appl. No. 11/928,594 (From Examiner); Nov. 26, 2002.
Hapner et al. "Java Message Service", Version 1.1, SUN Microsystems; Apr. 12, 2002.
Damron et al. ''Hybrid Transactional Memory', ASPLOS '06; Sun Microsystems, Inc.; Oct. 21, 2006-Oct. 25, 2006.
U.S.P.T.O Communication, Final Rejection for U.S. Appl. No. 11/748,044 dated Nov. 10, 2009.
U.S.P.T.O Communication, Final Rejection for U.S. Appl. No. 11/928,533 dated Apr. 8, 2011.
U.S.P.T.O Communication, Final Rejection for U.S. Appl. No. 11/928,594 dated Jul. 9, 2010.
U.S.P.T.O Communication, Final Rejection for U.S. Appl. No. 11/928,661 dated Aug. 27, 2010.
U.S.P.T.O Communication, Final Rejection for U.S. Appl. No. 11/928,857 dated Jun. 8, 2011.
Hapner et al. "Java Message Service", Version 1.1, SUn Microsystems; Apr. 12, 2002.
Harris et al., "Language Support for Lightweight Transactions", ACM SIGPLAN Notices, vol. 38, No. 11, ACM; Nov. 2003.
Luchango et al. "Hybrid Transactional Memory", ASPLOS '06; Sun Microsystems, Inc.; Oct. 21, 2006-Oct. 25, 2006.
U.S.P.T.O Communication, Non-Final Rejection for U.S. Appl. No. 11/748,044 dated Apr. 13, 2011.
U.S.P.T.O Communication, Non-Final Rejection for U.S. Appl. No. 11/748,044 dated Apr. 14, 2009.
U.S.P.T.O Communication, Non-Final Rejection for U.S. Appl. No. 11/928,661 dated Apr. 2, 2010.
U.S.P.T.O Communication, Non-Final Rejection for U.S. Appl. No. 11/928,857 dated Nov. 26, 2010.

U.S.P.T.O Communication, Non-Final Rejection for U.S. Appl. No. 11/928,533 mailed Oct. 29, 2010.
U.S.P.T.O Communication, Non-Final Rejection for U.S. Appl. No. 11/928,594 mailed Mar. 8, 2010..
U.S.P.T.O Communication, Notice of Allowance for U.S. Appl. No. 11/928,594 mailed May 25, 2011.
U.S.P.T.O Communication, Notice of Allowance for U.S. Appl. No. 11/928,661 mailed May 18, 2011.
PCT/EP20101062302—Written Opinion dated Nov. 22, 2010.
PCT/EP20101062302—International Search Report dated Nov. 22, 2010.

U.S.P.T.O Communication, Requirement for Restriction/Election for U.S. Appl. No. 11/928,533 dated Jun. 28, 2010.
Shavit et al. "Software Transactional Memory", Annual ACM Symposium on Principles of Distributed Computing, Proceedings of Fourteenth Annual ACM Symposium on Principles of Distributed Computing, ACM, 1995.
The Case of Compressed Caching in Virtual Memory Systems; Wilson et al.; Proceedings of the 1999 USENIX Annual Technical Conference; 1999 (Cited by Examiner in U.S. Appl. No. 11/928,594).

* cited by examiner

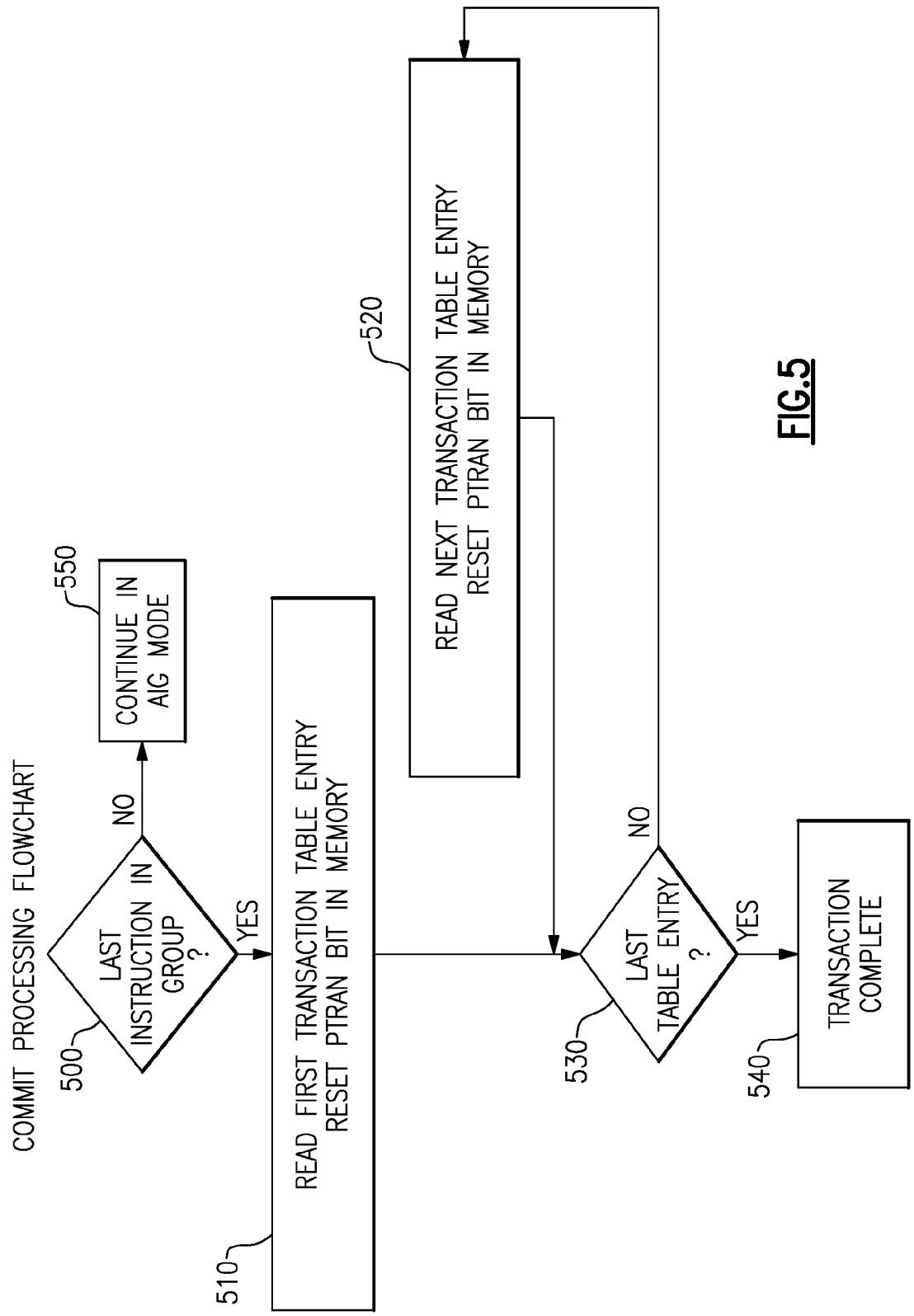

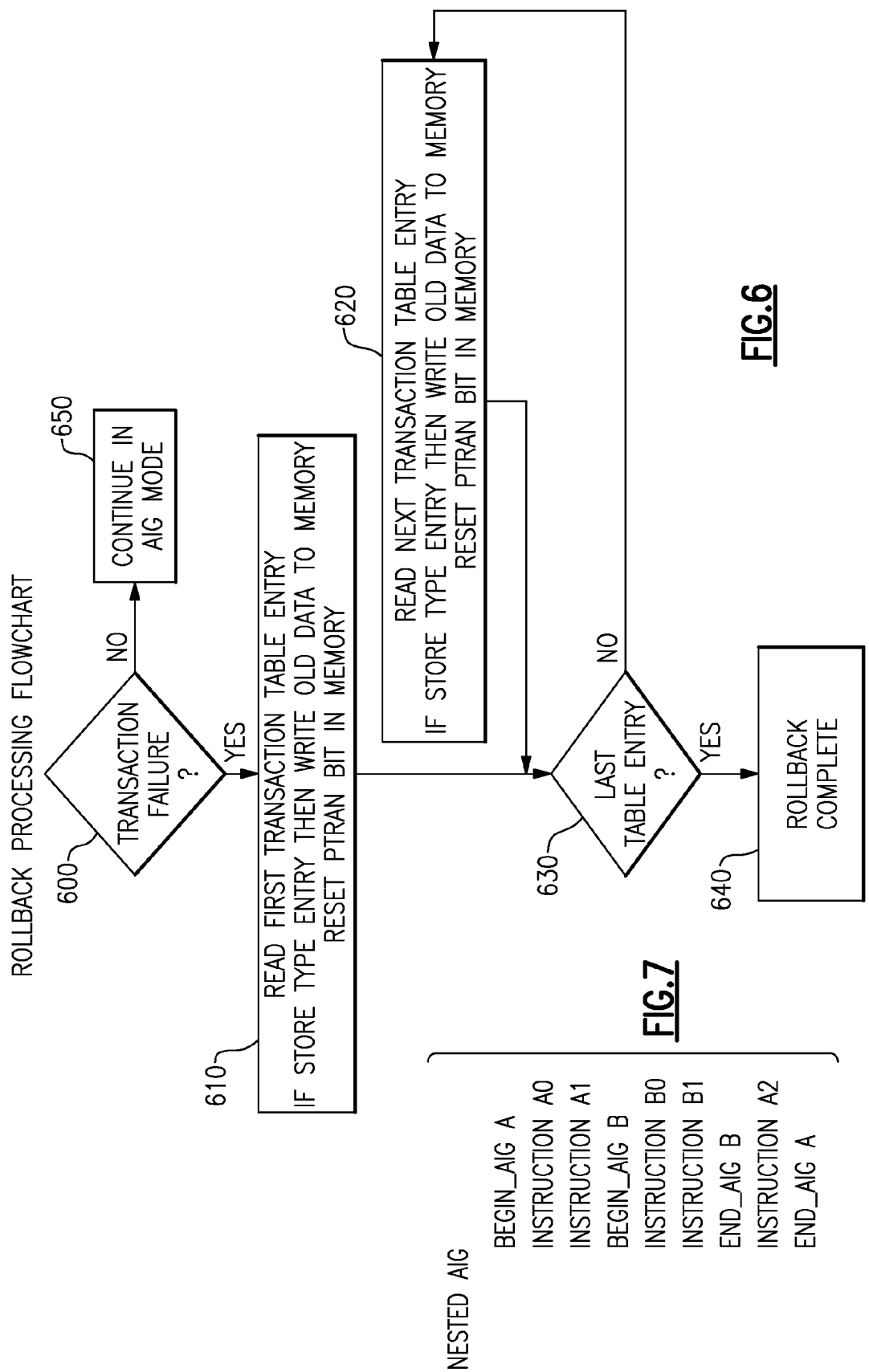

| ADDRESS HISTORY TABLE (AHT) | | | | |
|---|---|---|---|---|
| ENTRY TYPE | ACCESS TYPE | ADDRESS | THREAD ID | RESPONSE |
| 1010 | 1020 | 1030 | 1040 | 1050 |
| | | | | |
| | | | | |
| | | | | |
| ... | | | | |

TRANSACTIONAL MEMORY SYSTEM WHICH EMPLOYS THREAD ASSISTS USING ADDRESS HISTORY TABLES

CROSS-REFERENCE TO RELATED APPLICATIONS

This application is a continuation in part and contains subject matter which is related to the subject matter of the following co-pending application, which is assigned to the same assignee as this application, International Business Machines Corporation of Armonk, N.Y. The below listed application is hereby incorporated herein by reference in its entirety:

U.S. Ser. No. 11/748,044 filed May 14, 2007, entitled "COMPUTING SYSTEM WITH OPTIMIZED SUPPORT FOR TRANSACTIONAL MEMORY" by Thomas Heller et al.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to multiprocessor and multithreaded computing systems, and particularly to a computing system which uses specialized "Set Associative Transaction Tables" and additional "Summary Transaction Tables" to speed the processing of common transactional memory conflict cases and those which employ assist threads using Address History Tables.

2. Description of Background

Current multiprocessor and multithreaded computing systems allow the performance of a single software application to be scaled to many times the possible performance of a single threaded application. Current software and hardware systems provide for the parallel processing of multiple threads of execution. Software applications can use existing thread libraries, such as the POSIX pthread library, to control the creation of multiple threads of parallel execution. The use of multiple threads works well for applications that operate on easily partitioned tasks and data, course grain locks can be used to control access to the few shared data structures to prevent rare conflicts between the data updates of multiple threads.

Many software applications contain data structures that must be shared among multiple threads and have frequent concurrent inspections and updates of the shared data structures. These applications require additional modifications in order to obtain good scaling when using large numbers of threads. Applications which use multiple threads of execution that access shared data structures currently require the use of specialized data locking routines in order to produce a reliable outcome that is free from deadlocks and corrupted data. The majority of existing multithreaded applications in this category use fine grained software locks to achieve good performance and correct operation. Writing high performance multithreaded programs which use fine grained software locks is extremely difficult and requires expert programming skills. The lack of these skills in the software industry severely limits the production of multithreaded applications which require the use of shared data structures and therefore the usefulness of multithreaded and multiprocessor computing systems for certain application classes, including many forms of transaction processing.

Various "Transactional Memory" systems have been proposed and built to provide a simpler programming model for constructing multithreaded applications that need to control access to shared data structures. These systems allow software running on one thread of execution to optimistically assume that shared data structures can be updated without conflict with the accesses and updates of other threads of execution. The speculative updates to memory are kept "pending" until the transactional memory system confirms that no conflicts with storage accesses of other threads have occurred. The transactional memory system must be able to discard the pending speculative updates when conflicts between the storage accesses of multiple threads are detected. The existing systems range from those that rely completely on new software constructs to those that rely on a mixture of hardware and software to obtain reasonable performance. Some existing systems have very high overhead in terms of the number of instructions executed in support of the required transactional memory behavior. Other existing systems have limitations associated with data cache structures that hold the "pending" updates to memory.

SUMMARY OF THE INVENTION

The shortcomings of the prior art are overcome and additional advantages are provided through the provision of a transactional memory computing system which uses an "assist thread" and associated software speeds the processing of transactions. The assist thread is used to parallelize the execution of the required Transaction Table and allows the main thread of execution to continue to the next instruction with little delay. A specialized data buffer is provided for fast communication between the main thread of execution and the assist thread.

The computing system now provides specialized "Set Associative Transaction Tables" (SATT) and additional "Summary Transaction Tables" (Load Summary Tables (LSTs) and Store Summary Tables (SSTs) to speed the processing of common transactional memory conflict cases. All of these specialized "Transaction Tables" are used by transactional memory hardware or a transactional memory assist thread to reduce the execution overhead required for some common transactional memory operations. The Set Associative organization of the tables allows for very fast indexing when the transactional memory system is attempting to resolve a potential address conflict while processing a transaction. The "Summary Transactional Tables" (LSTs and STTs) allow the most critical information to be packed into a minimal number of data bytes so that they can be effectively cached in small fast hardware data caches that are close to the microprocessor core. The compact format of the Summary Transactional Tables as seen by the L1 caches enable the searching of the tables with a minimal number of load operations. The compact format also allows for a fast reset of the tables without the need to provide address pointers to multiple copies of the tables in memory. The conflict resolution of the invention is focused on improving the performance of certain common transactional memory operations which cause main storage accesses. Both the performance of an application using transactional memory constructs and the overall system throughput are improved with the use of the current invention.

In accordance with the invention a combination of specialized "Set Associative Transaction Tables" and additional "Summary Transaction Tables" to speed the processing of common transactional memory conflict cases is used with a "private to transaction" (PTRAN) tag, attached to each increment of real system memory, and a log of speculative loads and stores to provide an improved implementation of a transactional memory computing system. SATTs, LSTs and SSTs are implemented as software tables that are kept in real memory and managed by an "assist thread". Hardware is provided to quickly detect conflicts between the storage accesses of transactions running on multiple threads of execution. The use of the tag in memory and associated conflict detection hardware included in this invention provides a much faster transactional memory system with much less overhead when compared to existing systems. It is an improvement over software only transactional memory systems since it eliminates some of the software overhead associated with tracking the speculative state of transactions. It also provides the ability to detect storage conflicts at a very fine level (down to a single byte) as opposed to prior art software systems that track updates to entire software objects which may be hundreds or thousands of bytes. Existing software systems will either give frequent over-indication of potential data conflicts or incur very large software path length penalties when attempting to track the updates to individual components of software objects.

System and computer program products corresponding to the above-summarized methods are also described and claimed herein. Many software interfaces and instruction set modifications have been proposed for the support of transactional memory. The paper "Architectural Semantics for Practical Transactional Memory" (McDonald et al, Computer Systems Laboratory, Stanford University, 2006) compares some of the proposals and provides references for many others. The invention can be used to increase the speed of execution for any of them. The preferred embodiment is described for the PowerPC architecture but anyone skilled in the art could apply the same approach to any other architecture such as IBM z Series, Sun Sparc, Intel IA32 etc. Anyone skilled in the art could extend the current invention for use with other Application Programming Interfaces (APIs) that may be created for other specialized versions of transactional memory implementations.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which is also an improvement over existing hardware based transactional memory systems that rely on changes to cache coherence protocols. It allows the hardware system to deal with transactions which are long enough to overflow average size caches and doesn't involve the virtual memory management overhead of prior art schemes. It also allows for the ability to detect conflicts at a finer granularity than the cache line granularity of prior art systems that are tightly coupled with data caches. The current invention also allows for the fast execution of nested transactions.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 shows our commit processing flowchart.

FIG. 6 shows our rollback processing flowchart.

FIG. 7 illustrates new special instructions and Atomic Instruction Group (AIG) of instructions used in a nested AIG.

FIG. 10 illustrates more detail of the Address History Table (1000).

FIG. 18 shows the steps provided by the current invention for a fast and efficient resolution of the common case of an AIG store that inspects the associated PTRAN bit and finds that the bit is already set.

The detailed description explains the preferred embodiments of the invention, together with advantages and features, by way of example with reference to the drawings.

Figure 1:
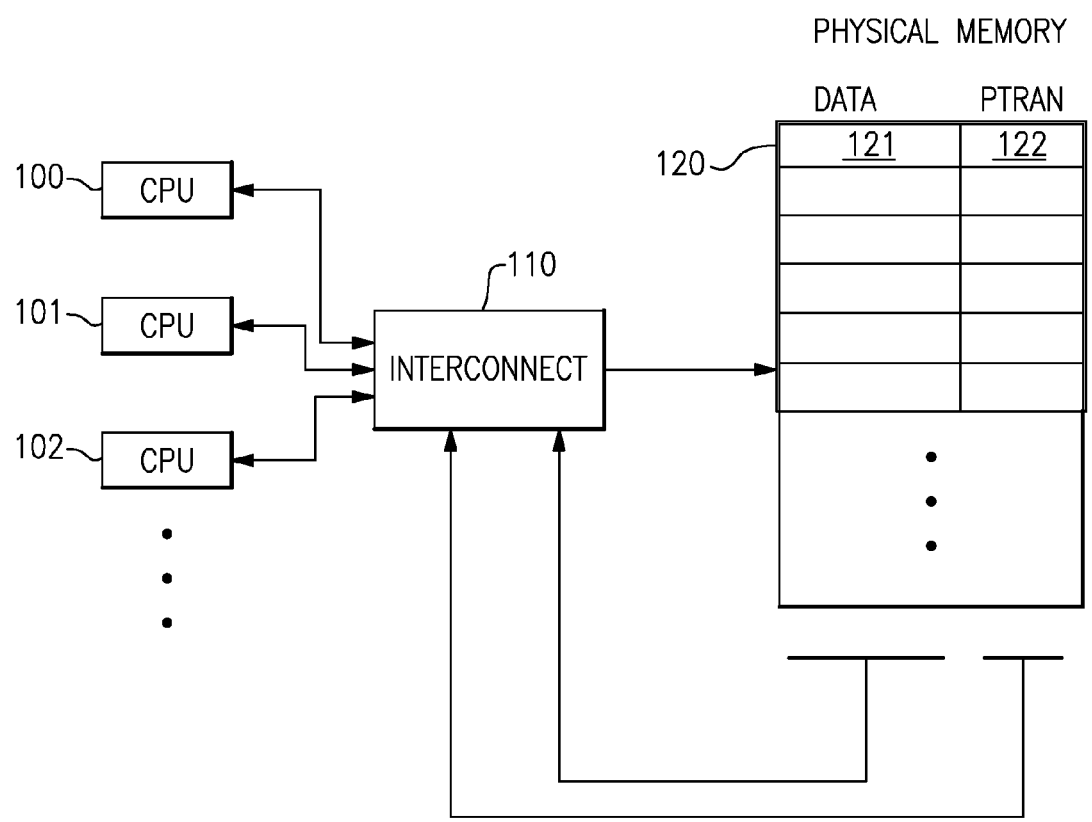
FIG. 1 illustrates our computing system with optimized transactional memory using physical memory.

DETAILED DESCRIPTION OF THE INVENTION in FIG. 1 there is a computing system illustrating an embodiment of our invention which has one or more microprocessors (100,101,102) coupled to a physical memory array (120) via an interconnection element (110). The physical memory array stores transaction data (121) and "private to transaction" (PTRAN) tags (122) which are associated with every increment of real system memory. The interconnection element (110) can be implemented as a shared bus or crossbar switch. The invention applies to systems which use any other scheme of interconnecting physical memory to a multiprocessor system which may be implemented in one or more chips. The memory could be broken down into smaller portions and distributed across private connections to each of the CPU chips as done for the IBM Systems using the Power4 microprocessor or for the AMD Opteron based servers. The microprocessors and memory controllers may be located together on a single silicon chip or they may be spread across multiple chips.

The physical memory of the computing system is divided into n increments. One or more "private to transaction" bits (PTRAN) associated with every increment of real system memory are provided for each of the n increments. The invention allows for the choice of any memory increment size and the best choice will depend on workload characteristics, hardware costs and data caching structure used in the target system. An increment of 16 bytes is used in the illustrated embodiment. The PTRAN bit(s) are used to indicate whether (or not) a data entry in memory is part of the speculative memory state of an uncommitted transaction that is currently active in the system.

Special new instructions (BEGIN_AIG, END_AIG) as illustrated by the Nested AIG code sequence of FIG. 7 are used to mark the beginning and end of a group of instructions. The instructions which execute between the special new instructions are referred to as an "Atomic Instruction Group" (AIG) illustrated by AIG instructions shown in FIG. 7 (Instruction A0, Instruction A1, Instruction A2). Additional storage access rules are used when a processor is executing instructions which are part of an Atomic Instruction Group. All of the storage locations modified by the AIG group of instructions are updated in memory in an atomic fashion. The updates to the storage locations are kept "pending" until the processor and/or software application indicates that they should be "committed". All of the updates are either committed to "normal" memory at once or they are discarded. The results are discarded when hardware and/or software detects a conflict between the storage accesses of multiple AIGs that are executing concurrently in the multiprocessor system. The invention provides a way for hardware to quickly detect potential conflicts between the storage accesses of multiple AIGs. Although the invention uses special new instructions to mark the boundaries of a transaction, any other method could be used to identify a group of memory locations that are to be updated in an atomic fashion. The invention is compatible with any number of software interfaces that may be used to implement a transactional memory system. The invention can provide the same fast conflict detection for any system which is attempting to provide an atomic update of multiple storage locations. The invention also applies to systems which mark the boundaries of an instruction group in any other ways, including compiler generated hints attached to other instructions, internal microprocessor commands generated by internal microcode or millicode.

The PTRAN tag is one or more bits associated with an increment in memory which is set for all memory accesses generated by instructions that are part of an Atomic Instruction Group. A processor inspects the bit before attempting to set it; this enables the quick detection of potential conflicts with other AIGs that are concurrently executing on other threads. The setting of the bit may be accomplished by a TS "test and set" operation of the IBM z/Architecture (as described by the IBM z/Architecture Principles of Operation) or any other equivalent operation that enables an atomic update in a multithreaded or multiprocessor system.

Figure 2:
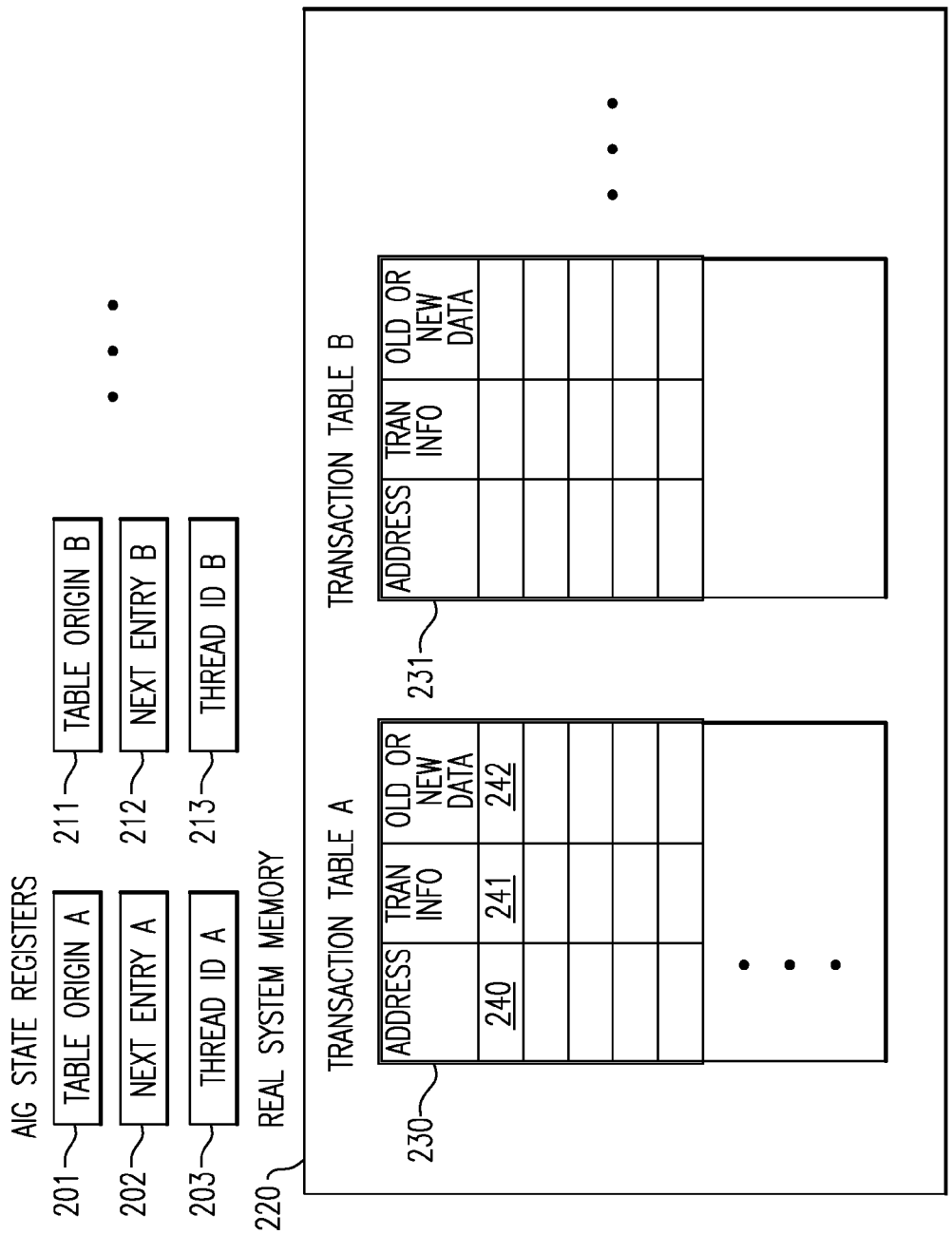
FIG. 2 illustrates our real system memory transaction tables.

Turning now to FIG. 2, it will be seen that Transaction Tables (230,231) are created as part of the real system memory (220) which is illustrated here as physical memory. The Transaction Tables could also created in logical or virtual memory. Any system to map the logical system memory to the physical system memory can be used, and there are numerous examples known in the art which can be used, such as those in the IBM zSeries, IBM's p Series, Sun Microsystems' SPARC, Intel's IA32 etc. A Transaction Table entry is made when instructions that are part of an Atomic Instruction Group cause a memory location to be inspected or updated. A Thread ID (203,213) is associated with each Transaction Table. A Next Entry register (202,212) is used as an index into the Transaction Table and indicates which entry should be written next. A Table Origin (201,211) indicates the address of the first entry of the Transaction Table for its thread (203, 213). The Transaction Table is used to hold additional information beyond the simple information that is associated with the PTRAN tag bit or bits that are associated with the memory location that has been inspected or updated. This additional information is related to the speculative state associated with an Atomic Instruction Group. In an illustrated IBM zSeries or pSeries CPU (100, 101, 102) embodiment which we describe here we prefer to use a single PTRAN bit. In this case the Transaction Table will contain all additional information about the speculative state, therefore the PTRAN bit will only indicate that a physical address is involved in an AIG. This is illustrated for Transaction Table A (230) as the address (240), the transaction info identifier (241) and old or new data (242). Other embodiments of the current invention may use additional PTRAN bits which can be used by hardware or software to speed the processing of certain events involved in the processing of Atomic Instruction Groups or the speculative states of any other transactional memory system. The combination of using just a single bit in memory and associating that bit with a more complete description of the transactional state in the Transaction Tables provides a transactional memory system which requires very little hardware overhead without incurring the performance penalty seen in prior-art software transactional memory systems.

Turning again to FIG. 2, it will be seen as we said that an entry in the Transaction Table, A for example (230), comprises the address (240) that has been inspected or updated inside of an AIG, a Tran Info field (241) and a Data Field (242). A store instruction that is part of an AIG will cause the system to copy the "old" data value from the original storage location to the Transaction Table entry for that address and the new speculative data is placed in the main storage location.

The invention can be made to work with the new values held in the Transaction Table if desired. The preferred embodiment places the "old" data value in the transaction table. This allows the system to be optimized for the case where most transactions are successful. The old data can be discarded quickly when it is no longer needed, when a transaction is committed permanently to memory, by changing the pointer to the transaction table or by clearing the contents of the transaction table. The Tran Info field of a Transaction Table entry (241) includes any transaction information that is needed to make detailed decisions about the need to cause a transaction failure. It also has provisions for additional information to allow efficient support of nested transactions, virtualized transactions or other extensions of the transactional memory architecture. In the preferred embodiment, the Tran Info field includes an indication of whether the storage access of the associated address (240) was a load type access or a store type access. The Tran Info field (240) can also indicate whether the address is shared among multiple AIGs in the system.

Figure 3:
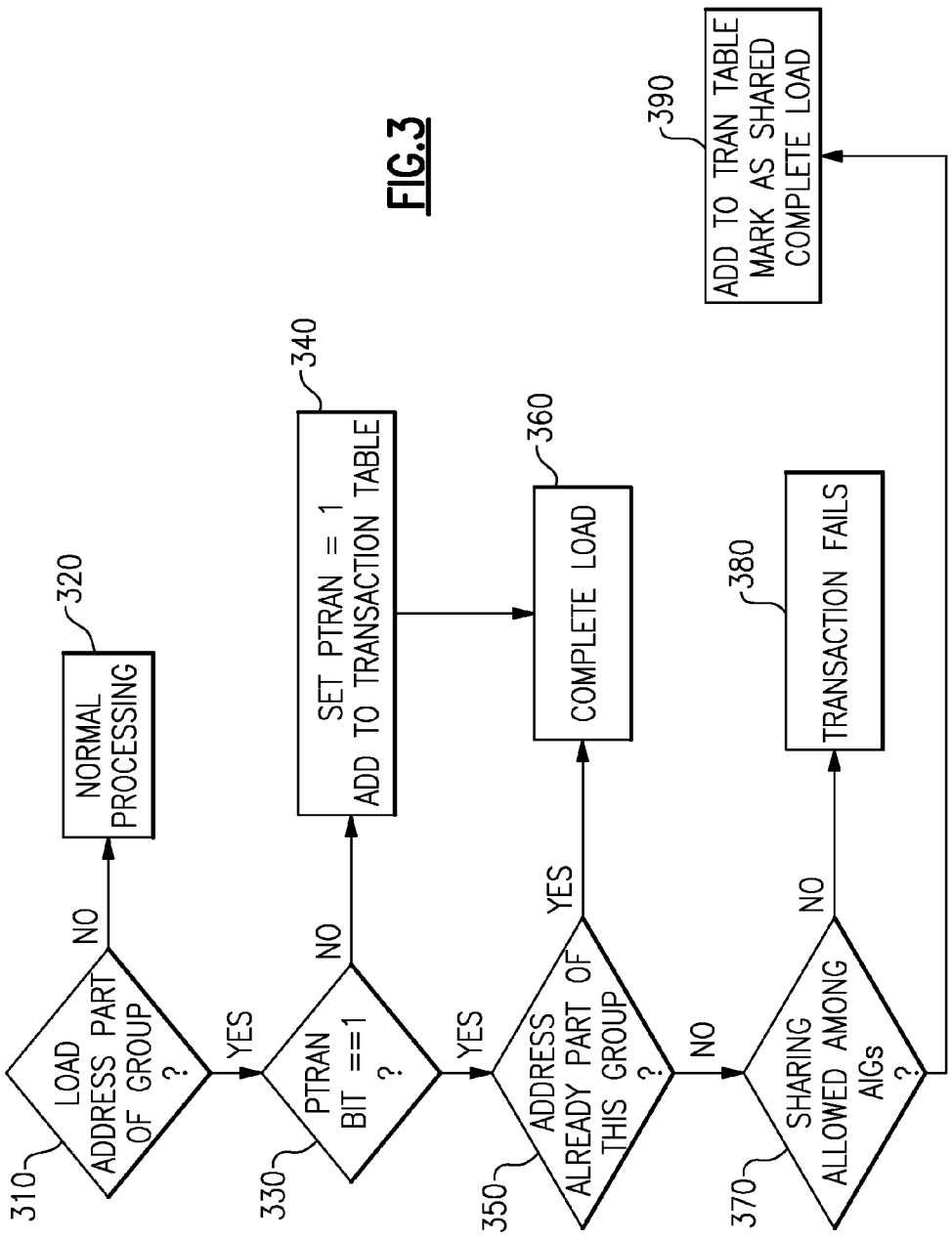
FIG. 3 shows our load processing flowchart and shows additional steps required when the PTRAN Bit is found to be already set (330) during the processing of a load type storage access within the bounds of a transaction.

FIG. 3 shows a load processing flowchart for the actions for tracking a speculative state using the PTRAN bit and the Transaction Tables. When a processor attempts a load type access, initially a decision (310) is made to determine whether the load access address is part of an AIG and whether the special storage access rules for AIG accesses apply. If not, normal processing applies and a normal load processing (320) operation is followed. Whether or not a load type access is part of an AIG may be determined in many different ways in the decision process step (310). A mode bit may be set in the processor pipeline or in load/store units to indicate that a special AIG mode of operation is active. The mode may be part of the physical state of the processor or the logical state of a virtual processor. If the special mode of operation is not active then the load is treated as a normal load (320).

An "override" of this "AIG active mode" may be provided. The override could be associated with the logical memory segment or logical memory page which contains the target address. An override forces the system to treat the storage request as normal in spite of the fact that the request is part of an AIG. If the override is active then the result of the decision (310) will cause normal processing (320) to take place. Assuming that an AIG is active and the override is not, then the associated PTRAN bit is inspected at an inspection step (330). A load instruction inside of an AIG detects upon inspection the state of the PTRAN bit. When the PTRAN bit is already set (330) it is due possibly to the actions of another thread executing on the same processor or on another processor. If at the inspection step 330 it is found that the PTRAN bit is not set (340) then the processor sets the PTRAN bit and make a record of the access in the Transaction Table (230) for the active AIG by adding to the Transaction Table at the Set PTRAN step (340) and then the complete load can continue (360). If the PTRAN bit is already set, the address which caused this potential conflict is compared with the addresses already entered in the processor's Transaction Table. If the PTRAN bit was set when tested at the inspection step (330) by another load earlier in the same AIG, it is already part of the AIG as tested and determined (350) and then the complete load may continue (360). Each Transaction Table (230, 231) contains the addresses for a particular AIG. Accordingly, if the address was not already part of the AIG as tested and determined (350) then the address for the load is not found in the processor's Transaction Table and then the processor checks whether the address is enabled for sharing among AIGs in a determination step for AIG sharing (370). If the address is not currently enabled for sharing among multiple AIGs the processor may signal other processors in the system to request a "shared AIG access" for this address during the determination step whether sharing is allowed among AIGs (370). A shared access can be granted if no other AIG in the system has speculatively written the storage location. If the shared access is not granted then the AIG fails (380), otherwise (390) the load address is added to the Transaction Table (230) and the Tran Info field (241) is updated to indicate that the address is a load access that is shared among multiple AIGs in the system.

Figure 4:
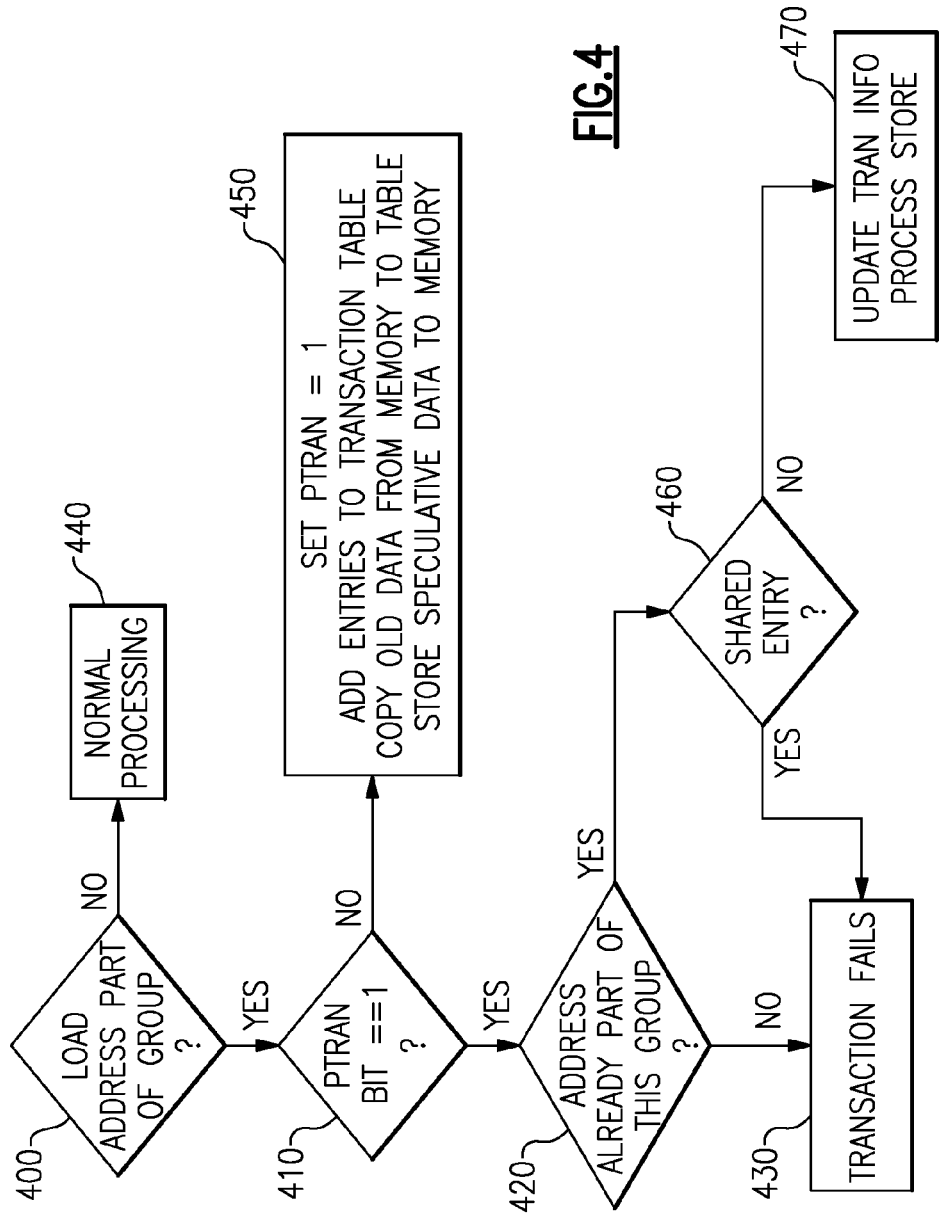
FIG. 4 shows our store processing flowchart.

The FIG. 4 Store Processing Flowchart shows the actions for processing a store that is part of an AIG. When a processor attempts a store type access initially a store decision (400) is made to determine whether the access is part of an AIG and whether the special storage access rules for AIG accesses apply. The mode of the processor is checked in a similar method as previously described for load accesses. If the special mode of operation, under which the special access rules for AIG accesses apply, is not active then the store is treated as a normal store (440). Assuming that an AIG is active, the associated PTRAN bit is inspected at the store process inspection step (410). If the PTRAN bit is not already set then the PTRAN bit is set at the store transaction step (450) and a new entry is added to the Transaction Table (230). The "old data" is moved to the Transaction Table entry (242), the address is written to the new entry (240) and the Tran Info field (241) is updated. The Tran Info field (241) is marked to indicate that the access associated with this entry was a store type access. The new store data is written to memory after the setting of the PTRAN bit is completed. If the inspection of the PTRAN bit (410) indicates that the bit was already set then a decision (420) is made based on whether the current store address is already part of an AIG which is active on the processor. The Transaction Table (230) for the processor is examined, if it is determined that the address is present in the Transaction Table then the Tran Info (241) for the entry is checked and a decision as to shared access entry (460) is made. If the Tran Info indicates that the entry is a load type access entry that is shared among multiple AIGs, the transaction fails (430) otherwise the Tran Info field for the associated entry is updated to indicate a store type access and the store is processed (470).

Turning now to the Commit Processing Flowchart of FIG. 5, it will be seen that the invention includes a set of actions completed when the last instruction in an AIG has been processed and the entire group is ready to be "committed" permanently to memory as determined initially at a test step (500). If not, the processing continued in AIG mode (550). An AIG is committed to memory when the processing of the loads and stores of the AIG according to flowcharts from FIG. 3 and FIG. 4 does not result in a Transaction Failure. In the case of AIG success then testing (500) determines the last instruction in an AIG has been processed and the entire group is ready to be "committed" permanently to memory. Then the Transaction Table is examined (510,520) and each entry for the AIG to be committed is read and its associated PTRAN bit is reset in memory at the Transaction Table commit step (530) determination.

A specialized hardware engine may be used to complete the performance of this commit operation. A combination of processor caches, multiprocessor coherency actions and the current invention can be used to provide software with the illusion that all of the memory updates for a single AIG occur simultaneously even though the main memory storage arrays are not updated simultaneously. During the commit processing, the resetting of the PTRAN bits continues until the last valid entry in the Transaction Table has been determined to be reached (530). At this point the AIG is considered to be committed and the performance by the engine therefore completes (540).

Some conditions prevent the completion of an AIG. These conditions may be detected during load processing while executing an AIG (380) or during store processing while executing an AIG (430). There are many other possible processor conditions that may cause the need to abort the processing of an AIG. These include error conditions detected in the system as well as other conditions that would require significant additional hardware support to enable the processor to handle them correctly. Many prior-art transactional memory architectures include provisions for the abort of transactions and for a subsequent retry. Prior-art software constructs can be used together with the current invention to eliminate the need to provide hardware to deal with all possible special cases. A simple example is the case of a timer interrupt in the middle of processing an AIG. The interrupt may cause the processor to spend a large amount of time running code that is not part of the partially completed AIG. It may not be desirable for the processor to keep the AIG active during this time. The system can force a transaction failure for any AIG that is currently executing when a timer interrupt occurs. A similar approach can be used for any other special case events occurring in the processor.

Transaction failures or forced retries are handled according to the process of the Rollback Processing Flowchart for "rollback" processing shown in FIG. 6. Turning now to FIG. 6, it will be seen that the lack of a transaction failure condition (600) allows the processor to continue in the AIG active mode (650). The preferred embodiment of the current invention uses an "eager" policy with respect to detecting transaction failures and causing transaction rollback. Also, the invention may be used in systems that wait until the end of a transaction to take the actions required for a rollback. The memory updates executed as part of an Atomic Instruction Groups are either committed to normal main storage at the same time (FIG. 5) or they are discarded with a "rollback" operation (620-640).

Upon finding a transaction failure condition (600) failure several additional steps are required (610,620). Rollback Transaction Table processing entry steps provide that the Transaction Table (230) for the AIG is inspected and any "old" data (242) is written back to the main memory address (240) indicated in the entry. The PTRAN bit for the associated address is reset. The rollback processing (620) continues until the last valid entry in the table has been processed (630). After the last valid entry has been processed, the rollback is complete (640). The actions taken by the processor at this point will differ based upon various software architectures for transactional memory. Any of transactional memory architectures described in the background may be used. In some cases the AIG will be retried from the beginning. In other cases special software handlers will be invoked to deal with the transaction failure. The current invention may be used with any of these different architectures.

The current invention supports the execution of "nested" transactions. A second AIG may be included within the scope of the first AIG as shown in FIG. 7. Each BEGIN_AIG special instruction (FIG. 7) statement causes the system to create a Transaction Table (230) and to associate the table with the AIG. Decisions about whether or not a storage address belongs to an AIG (350) may include the inner AIG (A) or the combination of the inner and outer AIGs (A & B). The END-AIG special instruction statement (FIG. 7) ends the transaction sequence, but as shown, a sequence for a specific transaction (Transaction B) may be nested within another sequence (Transaction A) The use of multiple Transaction Tables (230) may be used to support many nesting architectures for transactional memory. Multiple versions of the "old data" may be stored in any number of Transaction Tables (230) at any nesting depth. Prior-art transactional memory systems that rely on data caches to hold speculative state are unable to provide similar support for nested transactions without adding additional state information to cache directories and adding additional complexity to the cache coherency protocol. Nesting support on prior-art systems would impose a large hardware complexity penalty on those designs. The current invention can also be extended to include a combined Transaction Table that includes entries from both the inner AIG (Instruction B0, Instruction B1) and the outer AIG (Instruction A0, Instruction A1, Instruction A2). This Combined Transaction Table may be used in place of the individual Transaction Tables or in addition to the individual Transaction Tables.

There are many additional hardware features that can be added to the invention to speed the processing of the Transaction Table manipulations and the setting and resetting of the PTRAN bit(s). Since the PTRAN bit is part of the main storage data, it can be cached in the normal data caches of the system. The Transaction Tables are also part of main storage and can also be cached. Additional control information can be added to the data caches to indicate whether a specific address has been enabled for "shared AIG access" and therefore eliminate the need to search the Transaction Table for some cases.

The capabilities of the present invention as described above can be implemented in software, firmware, hardware along with some combination of software, and firmware.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The computing system described herein is able to detect the signal and recover a computer program embodied therein. It makes no difference whether the computer program is embodied in a physical media such as a hard drive or computer memory or on a CD or within a data signal. The underlying program is usable by the computing system to execute the steps described for a computer readable memory to execute the encoded functions regardless of the format of origin of the encoded program or whether the format is a disk or a signal.

The article of manufacture can be included as a part of a computer system or sold separately.

Additionally, at least one program storage device readable by a machine, tangibly embodying at least one program of instructions executable by the machine to perform the capabilities of the present invention can be provided.

Figure 8:
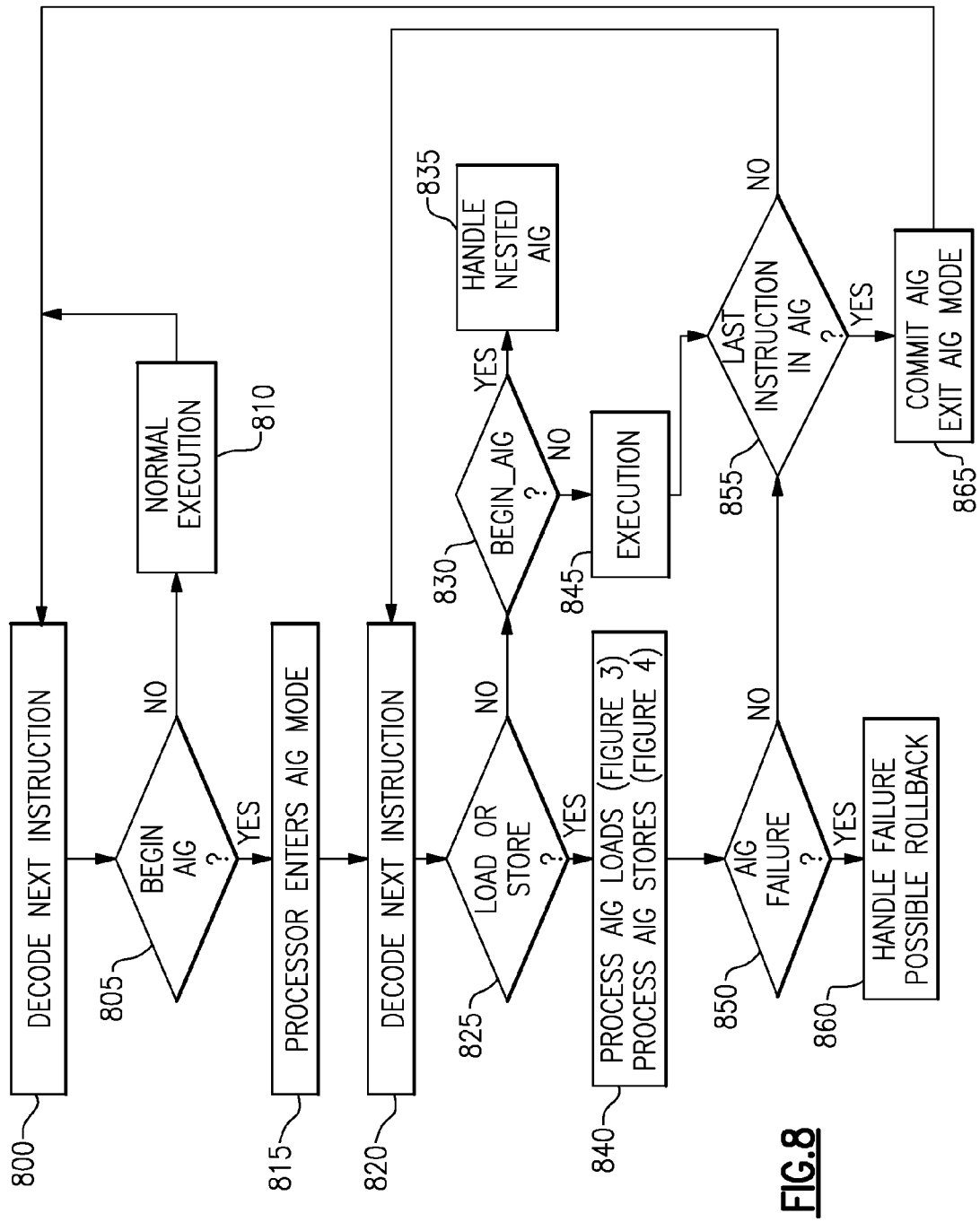
FIG. 8 is a generalized flowchart that shows the flow of decoding and execution of instructions in a computing system that uses the current invention.

FIG. 8 shows the flow of decoding and execution of instructions in a computing system that uses the current invention. The preferred embodiment of the invention uses a BEGIN_AIG instruction to indicate the beginning of an AIG and an END_AIG instruction to indicate the end of an AIG. Any other suitable method of marking the beginning and end of a group of instructions can be used. The instructions or marks may be inserted in the code explicitly by programmers in a high level language or added by compilers or translators as implementations of high level locking functions. The instructions or marks may be added by a library function call or be included by a special event in a runtime environment. The instructions or marks may be generated by firmware, hardware or a combination of both as a response to decoding a particular sequence of instructions or receiving a special command to enter a new mode of execution.

The preferred embodiment identifies the beginning of an AIG after decoding of an instruction (800). If it is determined that a BEGIN_AIG instruction has been decoded (805) the processor enters a new mode of execution, AIG MODE (815), otherwise the instruction is executed as usual (810) and processing continues with the next instruction (800).

Prior to entering AIG MODE, the architected state of the processor is saved in the same manner that a traditional Program Call is handled in the IBM Z-Series architecture. Any similar state saving mechanism may be used on any other processor architecture. The processor may return directly to this saved state if the AIG fails or may return to this state after a series of other error handling routines have been invoked. While in AIG MODE, decoding of instructions continues (820). If a load or store is decoded (825) then special handling of these loads and stores is required (840). The steps required for the processing of a load inside of an AIG are described in FIG. 3, those for a store inside of an AIG are described in FIG. 4. After loads and stores in an AIG are processed it is determined (850) whether there has been an AIG failure as described in the descriptions of FIG. 3 and FIG. 4. If there is a failure then special handlers are invoked (860). The actions of the special handlers for transaction failure may vary depending on the architecture of the system using the invention. Many methods of dealing with transaction failures have been described in the prior art, any of them could be used for this purpose. The possible methods include retrying the transaction from the beginning for a set number of attempts, waiting for the condition that caused the failure to change, calling specialized software routines to resolve conflicts among threads etc. These possible failure handlers may require the rollback of the AIG which caused the failure (860). If no failure was detected then it is determined whether the load or store was the last instruction of the AIG (855). If the instruction is the last instruction in the AIG then the AIG is committed (865) using the process described in FIG. 5. The processor then exits the AIG Mode and continues with the next sequential instruction after the AIG (800).

The decoding of instruction other than loads and stores inside of an AIG does not necessarily require special processing (830). If the instruction is not a load or store type instruction then it is determined whether the instruction is another BEGIN_AIG (830). Nested AIG instructions require special handling (835). The prior art contains many different ways of handling nested transactions. The current invention can be used to support any of them. The nested AIG handler for the preferred embodiment adds the instructions of the "inner" AIG to the "outer" AIG creating a single larger AIG. Other embodiments of the invention may provide different rules of processing for loads and stores that are part an inner nested transaction as well as special rules for the commitment and failure handling of inner nested transactions. If it is determined that the instruction is not a BEGIN_AIG then the instruction is executed (845) and it is next determined (855) whether the instruction is the last instruction of the AIG. The preferred embodiment uses the decoding of an END_AIG instruction to indicate that the last instruction of an AIG has been reached. If the last instruction of the AIG has been reached then the AIG is committed to memory and the processor exits the AIG MODE of operation (865).

Address History Tables and Assist Threads

Figure 9:
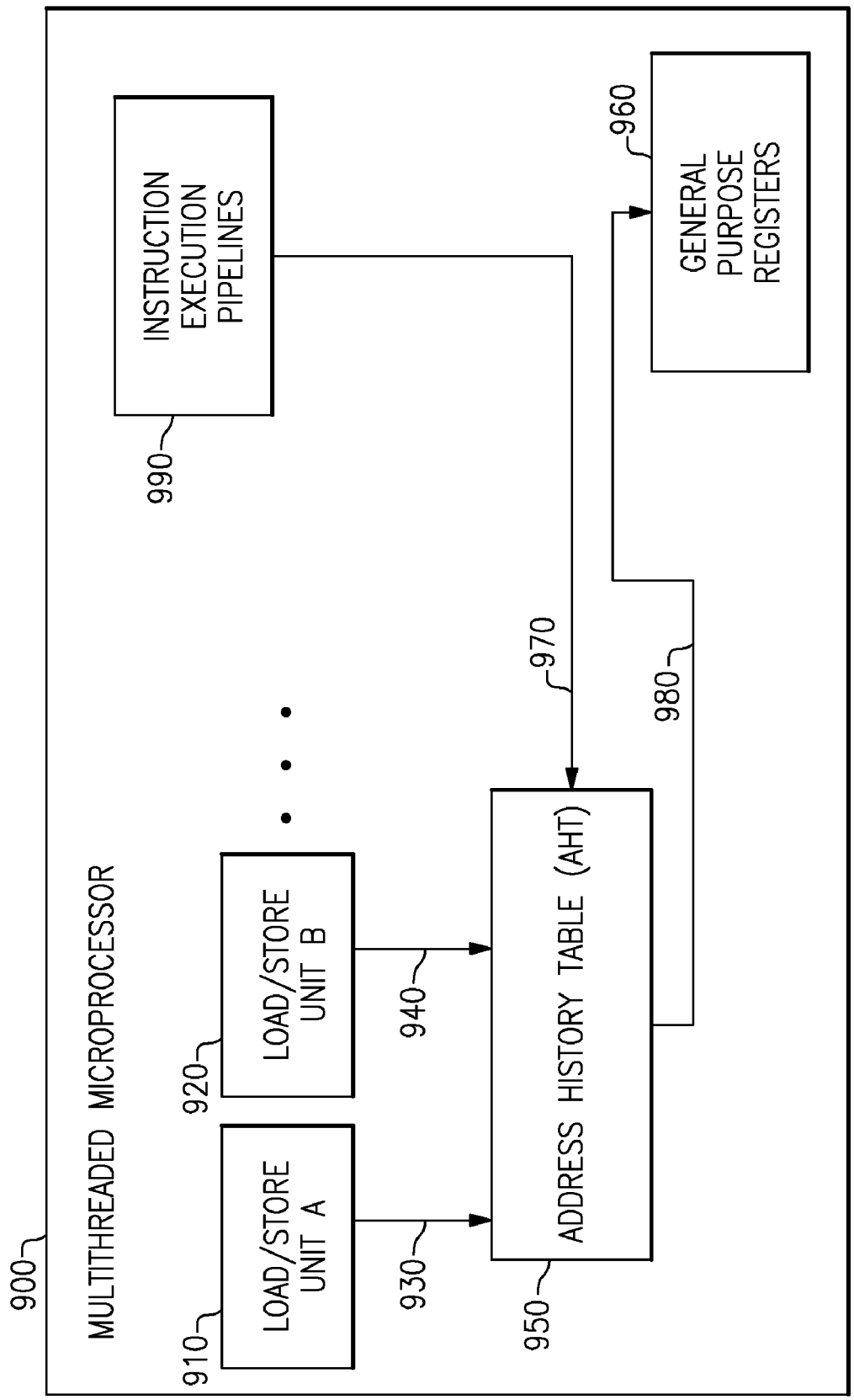
FIG. 9 illustrates the Address History Table (950) that is part of a multithreaded microprocessor (900) that has been designed for support of transactional memory.

Turning to FIG. 9, it will be seen that the current invention uses a new Address History Table (950) that is part of a multithreaded microprocessor (900) that has been designed for support of transactional memory. The preferred embodiment uses a microprocessor that supports simultaneous multithreading (SMT) but other forms of multithreading such as hardware multithreading (HMT) may be used. The microprocessor in the preferred embodiment supports 4 simultaneous threads. Entries in the AHT are written by the load store units (910,920) over new interfaces (930,940) that carry command, control, address and data information. Command and control information may also be written into the AHT from the Instruction Execution Pipelines (990). The contents of the AHT may be copied or moved to the General Purpose Registers (960) of the microprocessor over the new interface (980) provided for that purpose.

FIG. 10 illustrates more detail of the Address History Table (1000). In the preferred embodiment the Address History Table (AHT) is a hardware register file. The AHT could be implemented as an SRAM or DRAM array or any other suitable storage element. The AHT could also be implemented outside the microprocessor core or on another chip. The AHT could also be implemented as a software table in main memory. The AHT contains an "Entry Type" field (1010). A non-zero Entry Type is considered a "valid" entry. The Entry Type may be a specialized command or an "Address Record". In the case of an "Address Record" entry, the Access Type field (1020) will contain an indication of whether the address was from a store type access or a load type access. The "Address" field (1030) contains the real address of the storage access. The "Thread ID" field (1040) indicates the thread of execution that is processing an AIG and which caused the entry in the AHT to be created. The "Response" field (1050) is used to associate hardware responses to AHT entries. The responses may indicate that steps required during the processing of addresses stored in the AHT have been completed. The response field may be just a single bit for one response or may be multiple bits which are used to represent multiple responses or multiple stages if a series of responses are required.

Figure 11:
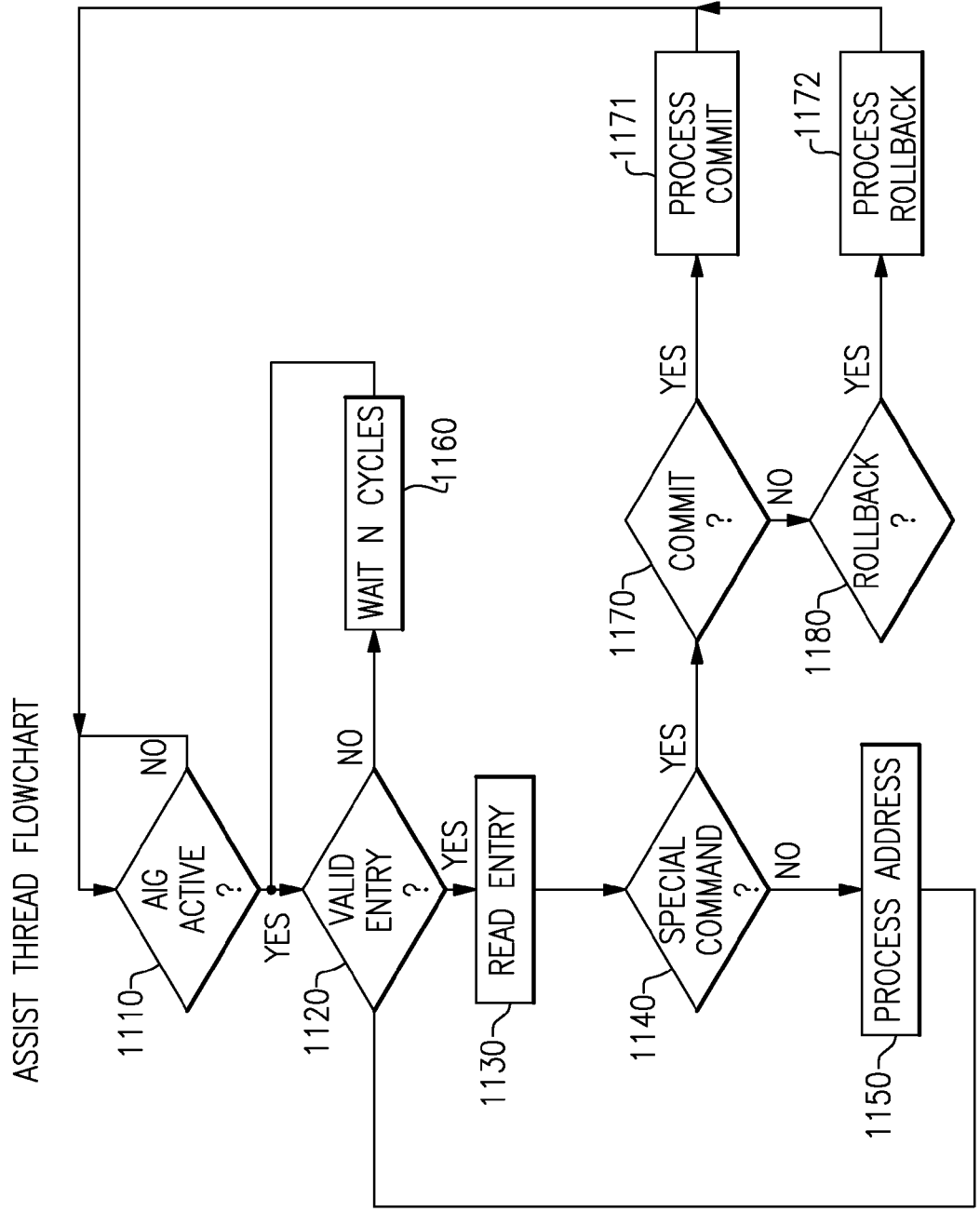
FIG. 11 illustrates the steps necessary for processing the storage accesses of an AIG using the "assist thread".

The steps necessary for processing the storage accesses of an AIG using the "assist thread" are shown in FIG. 11. In the preferred embodiment the assist thread is another thread of execution on the same microprocessor that is currently executing the AIG. The assist thread could also be running on another processor core and accessing the AHT indirectly through shared memory or any other suitable interface. The assist thread could also be on another microprocessor chip or in another system running on the same Instruction Set Architecture (ISA) as the main thread or on a different ISA. A single assist thread can be used to support the execution of any number of AIGs which are running on other threads of execution. The preferred embodiment uses one assist thread per microprocessor core. The assist thread does not need to take any action if there is no AIG active (1110) on any thread running on the microprocessor core that it is assisting. If an AIG is active, the assist thread determines whether there is a valid entry in the AHT (1120). In the preferred embodiment a non-zero Entry Type (1110) indicates a valid entry. If no entry in the AHT is valid the assist thread waits (1160) for N cycles before checking again. The value N can be set by hardware, software, or any other suitable means. The optimal value will depend upon many factors which may be determined at run time or predetermined at some earlier time. Valid entries are read (1130) out of the AHT by the assist thread and may be moved to general purpose registers that are made available by whatever microprocessor architecture that the assist thread is executing on. The Thread ID field (1040) is used to determine thread of execution that created the AHT entry. The assist thread uses the Thread ID to determine which set of AIG Transaction Tables must be updated. The preferred embodiment uses a single AHT to hold the information related to all of the AIGs that are simultaneously executing on the multiple threads of execution of the multithreaded core. Other implementations may use one AHT per thread and use a single assist thread to check for valid entries in all of the AHTs in a round robin fashion. Other implementations may use one AHT per thread and use multiple assist threads.

If the Access Type (1120) of the entry is a special command (1140) the assist thread determines the type of command (1170,1180) and takes the appropriate actions (1171,1172). If the Access type is not a special command then the assist thread uses the Access Type (1120) and Address (1130) to update the software tables associated with the correct AIG.

In the preferred embodiment the assist thread performs the actions shown in FIG. 3 and FIG. 4 as part of the actions shown in (1150). These actions include setting the PTRAN bit. After processing store type accesses that are part of an AIG, the assist thread indicates to the load/store units that the held store may be released. The preferred embodiment uses a specialized instruction pipeline command to provide this indication to the load/store unit.

Figure 12:
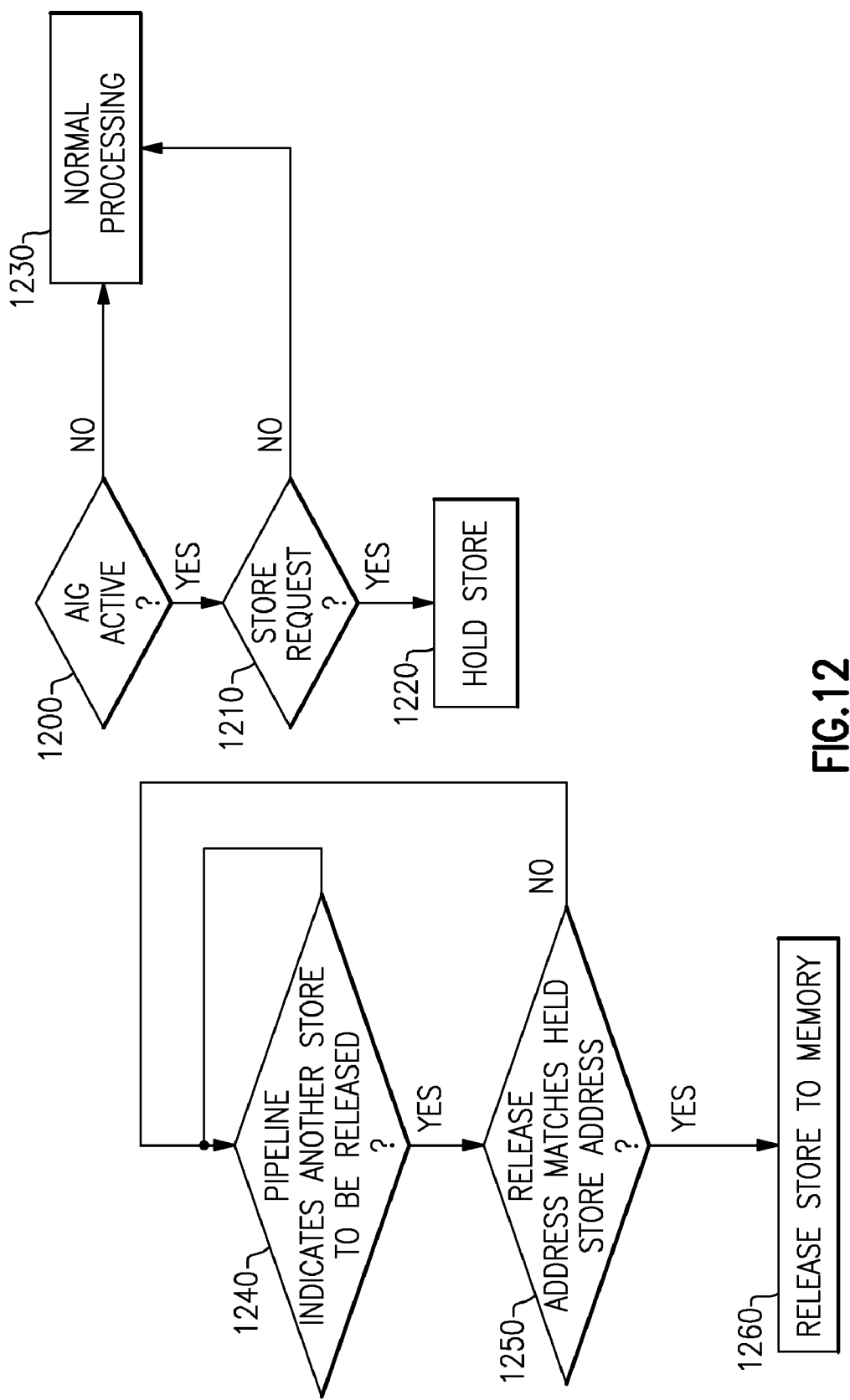
FIG. 12 illustrates actions of the load store unit.

FIG. 12 shows the actions of the load store unit. It is determined if an AIG is active (1200). If no AIG is active on the microprocessor core then loads and stores are processed as normal. If an AIG is active then it is determined if the load/store unit is processing a store request (1210). If a store is being processed by the load/store unit then the request must be held waiting (1220) for the assist thread to complete processing the associated address. This step effectively makes the load/store unit wait until the PTRAN bit for the associated address has been set by actions of the assist thread.

In parallel with the AIG active decision (1200), another decision is made by the load/store unit. Each cycle it is determined (1240) whether the instruction pipeline of the microprocessor indicates that a store should be released. If a store is to be released it is determined (1250) whether the load store unit is currently holding a store that has an address that matches the address of the store to be released. If the addresses match then the store is released to memory (1260) or to caches in systems that use caches. If the addresses do not match then no action is taken regarding the held stores and the load/store unit waits for another indication that a store is to be released (1240).

The Specialized Transaction Tables.

Now, the computing system has been developed which uses specialized "Set Associative Transaction Tables" and additional "Summary Transaction Tables" to speed the processing of common transactional memory conflict cases used with a "private to transaction" (PTRAN) tag, attached to each increment of real system memory, and a log of speculative loads and stores to provide an improved implementation of a transactional memory computing system, it will be recognized that FIG. 3 shows additional steps required when the PTRAN Bit is found to be already set (330) during the processing of a load type storage access within the bounds of a transaction. It must be determined (350) whether the address is already part of the current group because the PTRAN bit was set by the current transaction.

Figure 13:
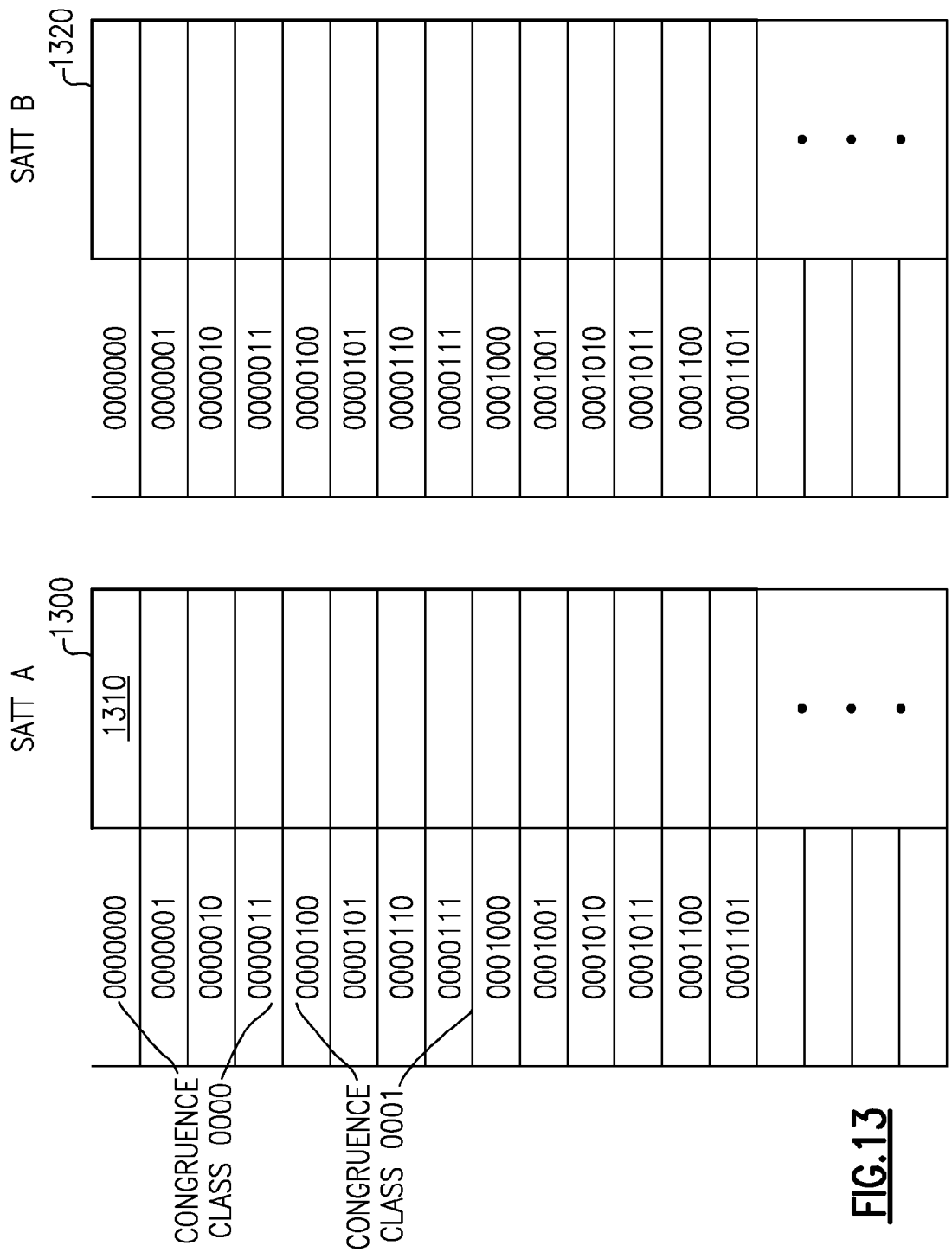
FIG. 13 illustrates a set associative transaction table (SATT) showing the multiple Set Associative Transaction Tables (SATT) (1300, 1320) used in the embodiment illustrated.

Turning now to the computing system which uses specialized "set associative Transaction Tables", FIG. 13 shows multiple Set Associative Transaction Tables (SATT) (1300, 1320), or multiple set associative transaction tables. At least one SATT is created for the system executing AIGs. The preferred embodiment uses one SATT for each microprocessor. All of the hardware threads that share a single microprocessor share a single SATT. Each entry in the SATT contains the address of one storage access that occurred during the execution of an AIG. The SATT is used in addition to the Transaction Table. A set associative transaction table (SATT) will be seen, as illustrated in FIG. 13, to have a number of congruence classes which allow fast search based on a subset of the storage address used in the system. These are stored in a supervisory area of the computing system. The fast access of these tables is performed like set associative data cache searching.

Figure 14:
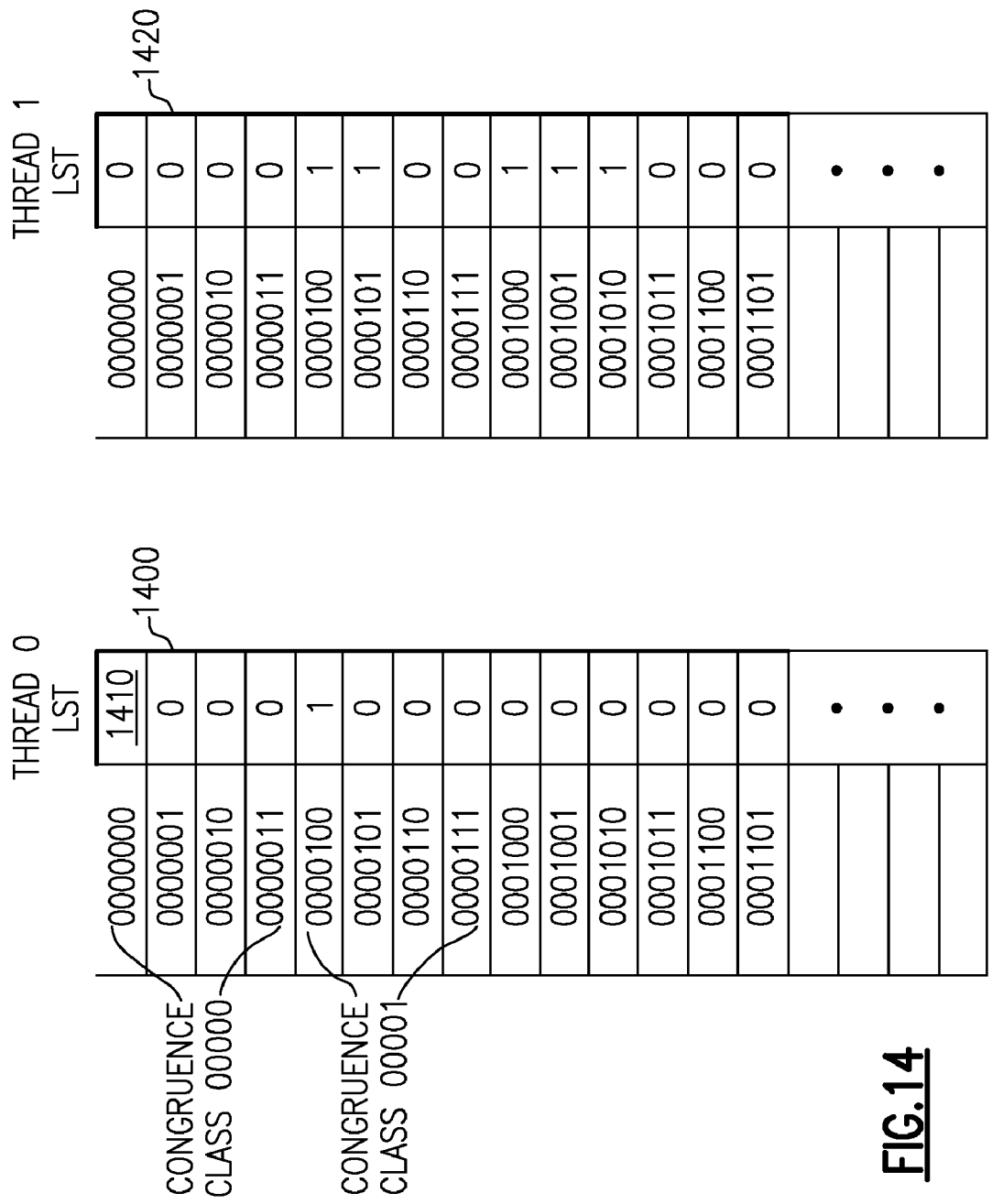
FIG. 14 illustrates multiple set associative Load Summary Tables (LSTs) (1400,1420).

FIG. 14 shows multiple Load Summary Tables (LSTs) (1400,1420), also a set associative table. One LST is provided for each hardware thread of each microprocessor in the system. Each entry of the LST is a single bit. Each LST entry (1410) is associated with one entry in one of the SATTs. The associated entries are at the same displacement from the logical table origins. The combination of the four LST entries at a given depth into the LST table (one per hardware thread) can be used together to form a "valid" bit for a microprocessor's SATT entry at the same index depth. An SATT entry is only valid if at least one of the associated LST entries is set.

Figure 15:
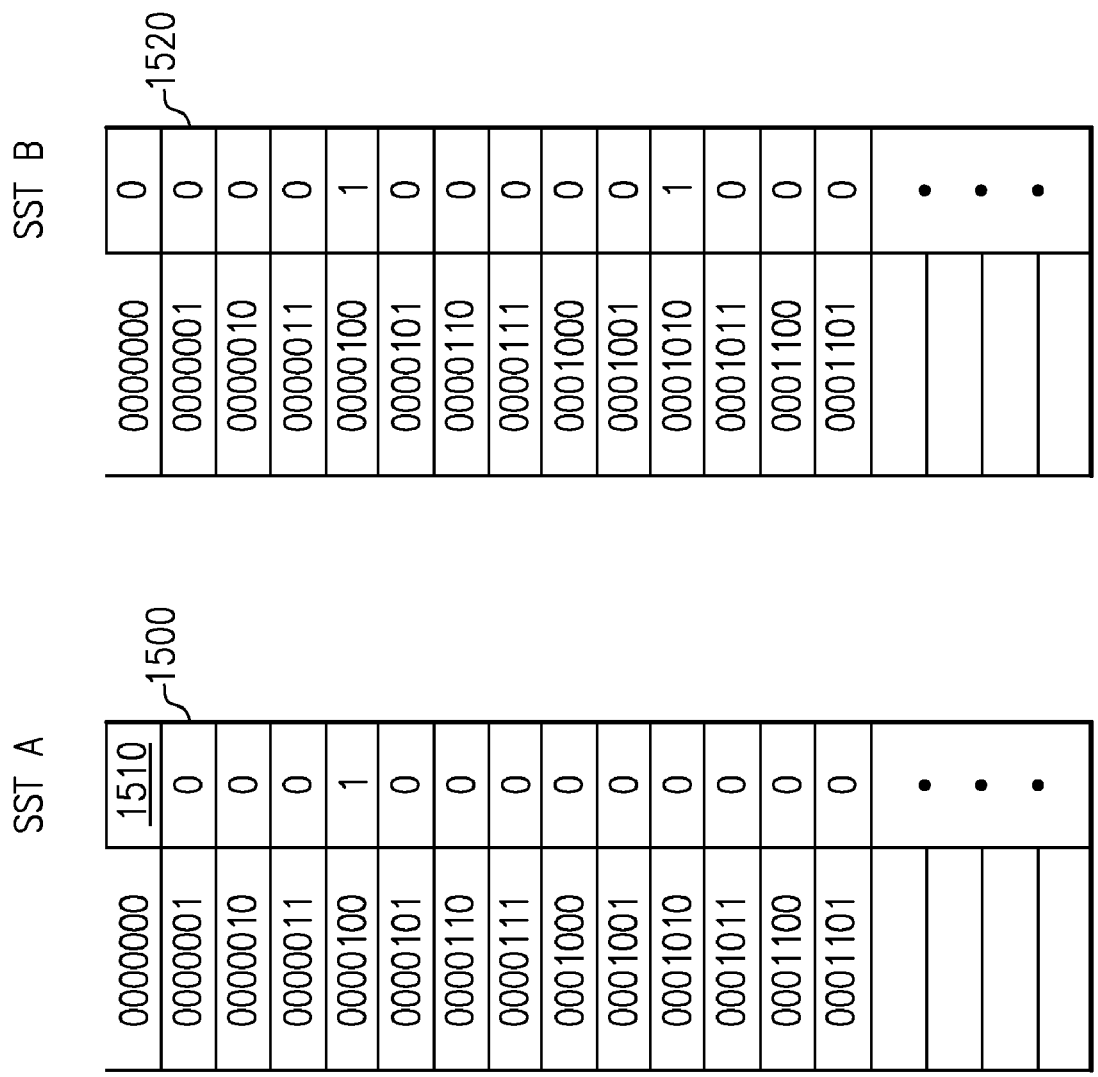
FIG. 15 illustrates shows multiple set associative Store Summary Tables (SSTs) (1500,1520).

FIG. 15 shows multiple Store Summary Tables (SSTs) (1500,1520)), also a set associative table. One SST is provided for each microprocessor in the system. Each entry of the Store Summary Table is a single bit. Each SST entry (1510) is associated with one entry in one of the SATTs. The associated entries are at the same distance from the logical table origin. The SST bit is set to indicate that the address in the associated SATT table is a store type reference that is part of a currently executing AIG. In the preferred embodiment there will be 4 LST entries associated with each SST entry, one for each of the 4 hardware threads. The associated LST entries are at the same displacement from the logical table origin as the SST entry. Only one of the 4 LST entries will contain a 1 when the associated SST entry contains a 1. A maximum of one AIG may have store access rights for any single storage increment.

In the preferred embodiment the SATTs, LSTs and SSTs are implemented as software tables that are kept in real memory and managed by an "assist thread". Other implementations of the invention may implement any one of these tables or all of these tables in hardware. The entire tables of the SATTs, LSTs and SSTs or any portion of their entries may be buffered by hardware in any suitable caching structure.

The entries of the SATTs, LSTs, and SSTs may be kept in linear tables in the real system memory. They may also be mapped to any other format that is optimized for faster search, improved caching behavior, reduced memory footprint, or other optimized feature.

Figure 16A:
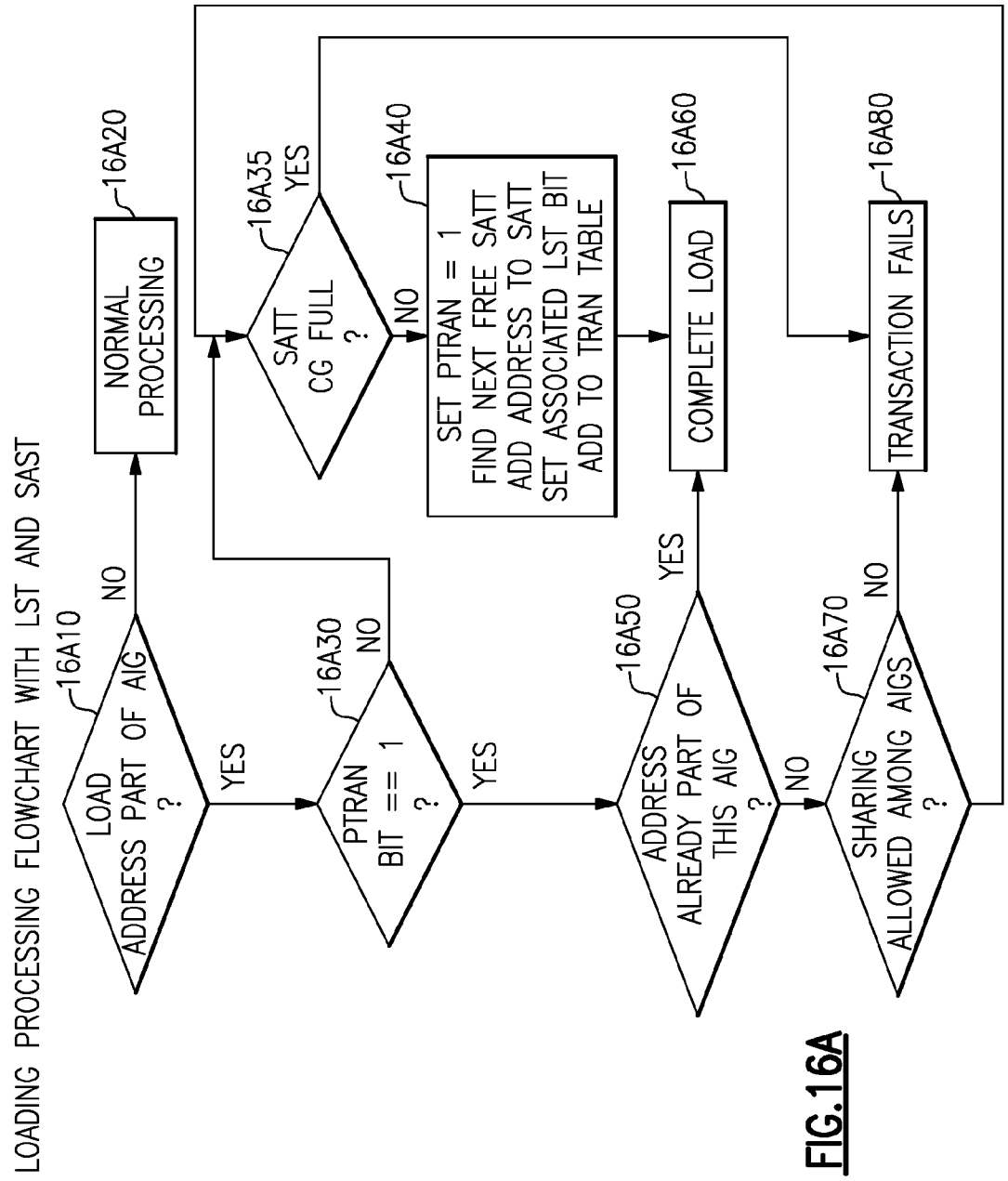
FIG. 16A illustrates the actions required to create entries in the SATT and LST during the processing of a load request.

The actions required to create entries in the SATT and LST during the processing of a load request are shown in FIG. 16A. It is first determined whether the storage access is part of an AIG (16A10). Normal load processing (16A20) is used if the request is not part of an AIG. A decision is made (16A30) based on the current setting of the PTRAN Bit for the address of the current storage request. If the PTRAN Bit is not set then the LSTs for the hardware threads on the processor associated with the current request are accessed. All of the LST bits for the congruence class corresponding to the current request's address are examined. If the SATT congruence class is full (16A35) then the transaction must fail (16A80) due to a lack of room in the SATT congruence class. An SATT congruence class is considered full if all 4 of the SATT entries for that congruence class are already valid. An SATT entry is valid if one or more of the associated LST entries associated with that SATT entry is set. If there is still room in the SATT congruence class, the bits of the LSTs for the target congruence class are walked through to find the first available SATT entry. One of the LST bits associated with the available SATT entry is set, the appropriate LST for the hardware thread currently executing the AIG. The address is written to the associated SATT entry using the same displacement into the table as the displacement used to mark the LST.

Figure 17:
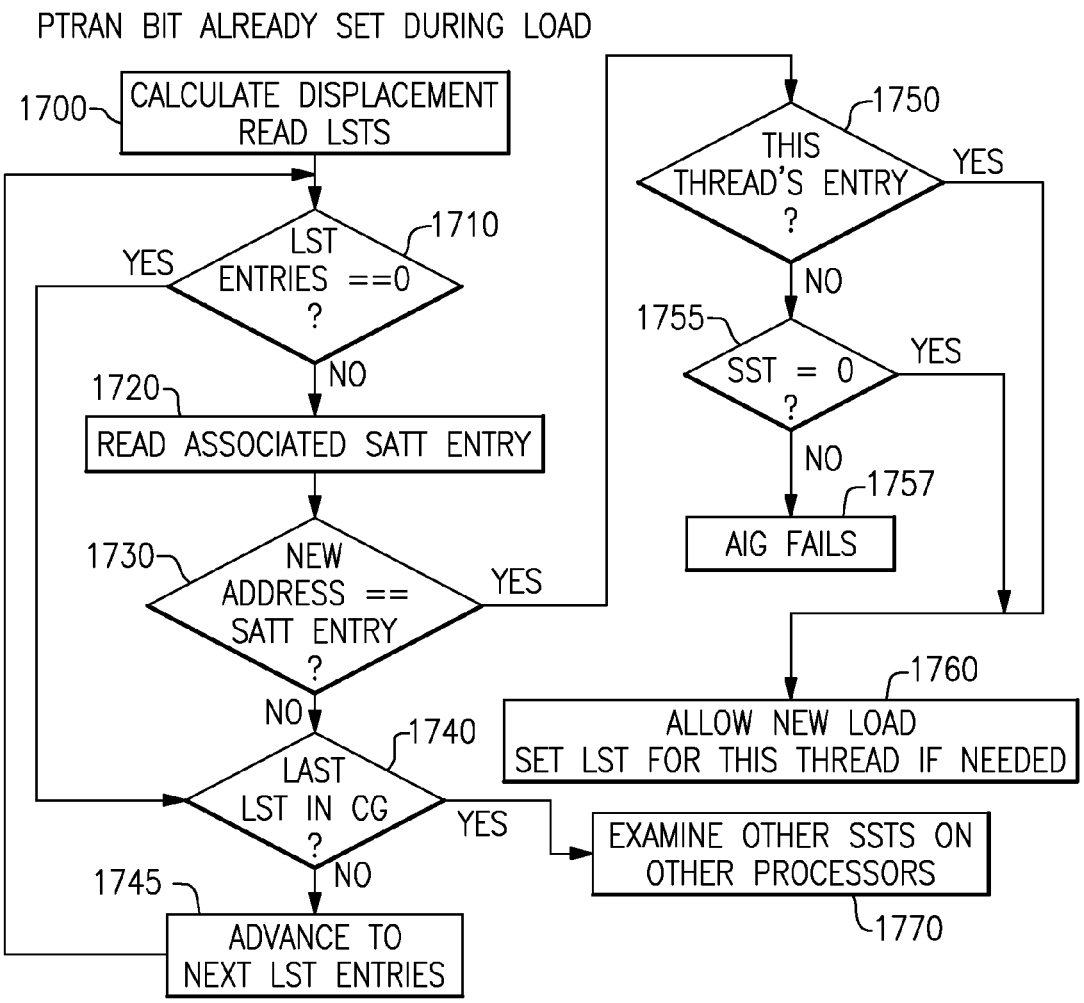
FIG. 17 illustrates the additional steps to make the combination of the LST and SATT entries quickly determine if the address is part of the current AIG for a fast and efficient resolution of the common case of an AIG load that inspects the associated PTRAN bit and finds that the bit is already set.

If the PTRAN Bit is already set then it must be determined whether the address of the current load is already part of the AIG (16A50). It can be that this decision was determined by walking through all of the entries of the associated Transaction Table to find a potential match. However, a faster method shown in FIG. 17 is used in FIG. 16A. If it is determined that the address is already part of the current AIG then the load is completed (16A60). If the address is not part of the current AIG it is still possible for the load to be processed. It may be determined (16A70) that the address is either currently marked as "shared among AIGs" or that the address may be changed to the state which allows it to be "shared among AIGs". This may be determined by state information that is kept in the Transaction Tables. In this case (16A90) the address is added to the transaction table of the current AIG and the entry is marked as "shared among AIGs".

Figure 16B:
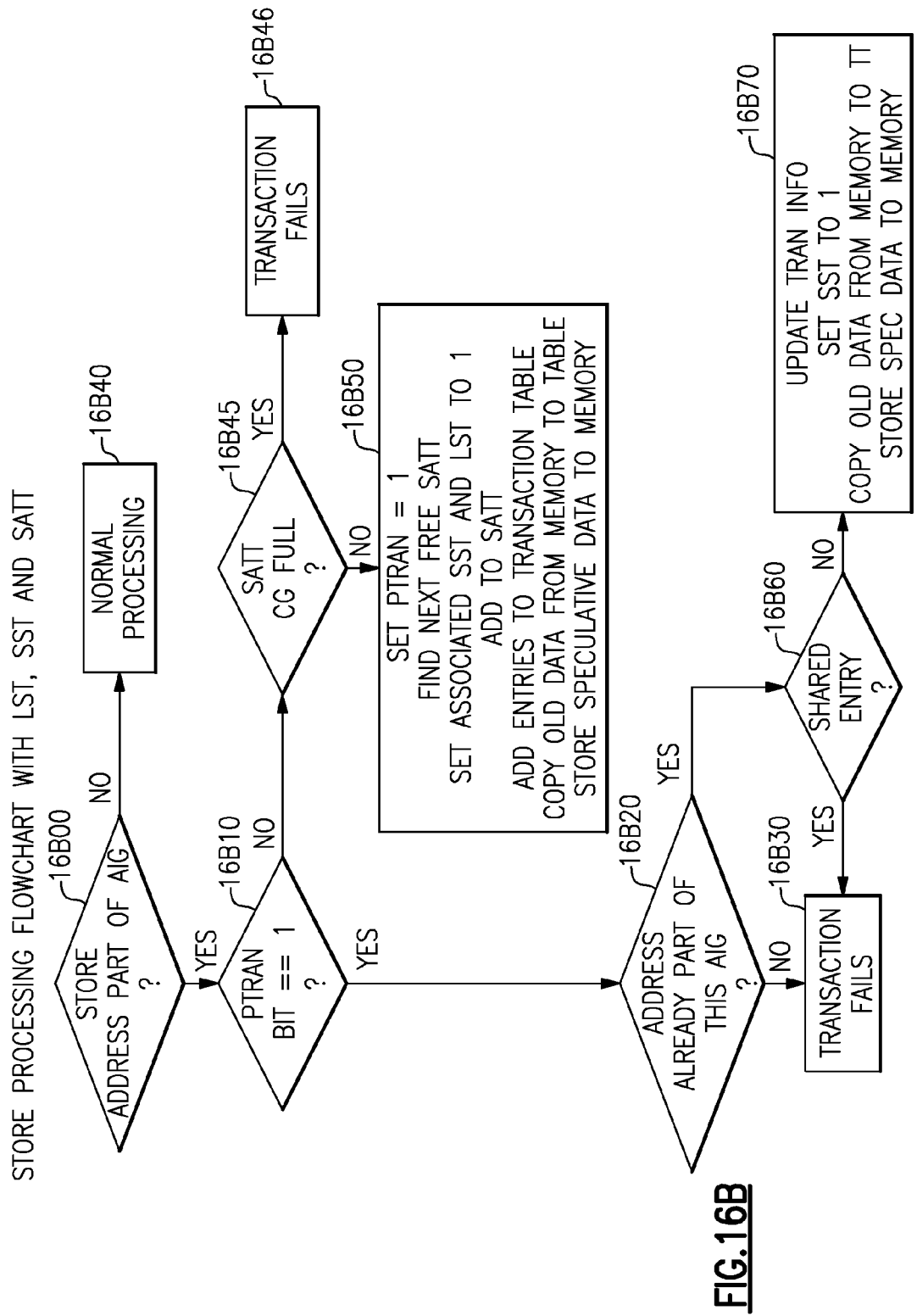
FIG. 16B illustrates the actions required to create entries in the SATT, LST and SST during the processing of a store request.
Figure 18:
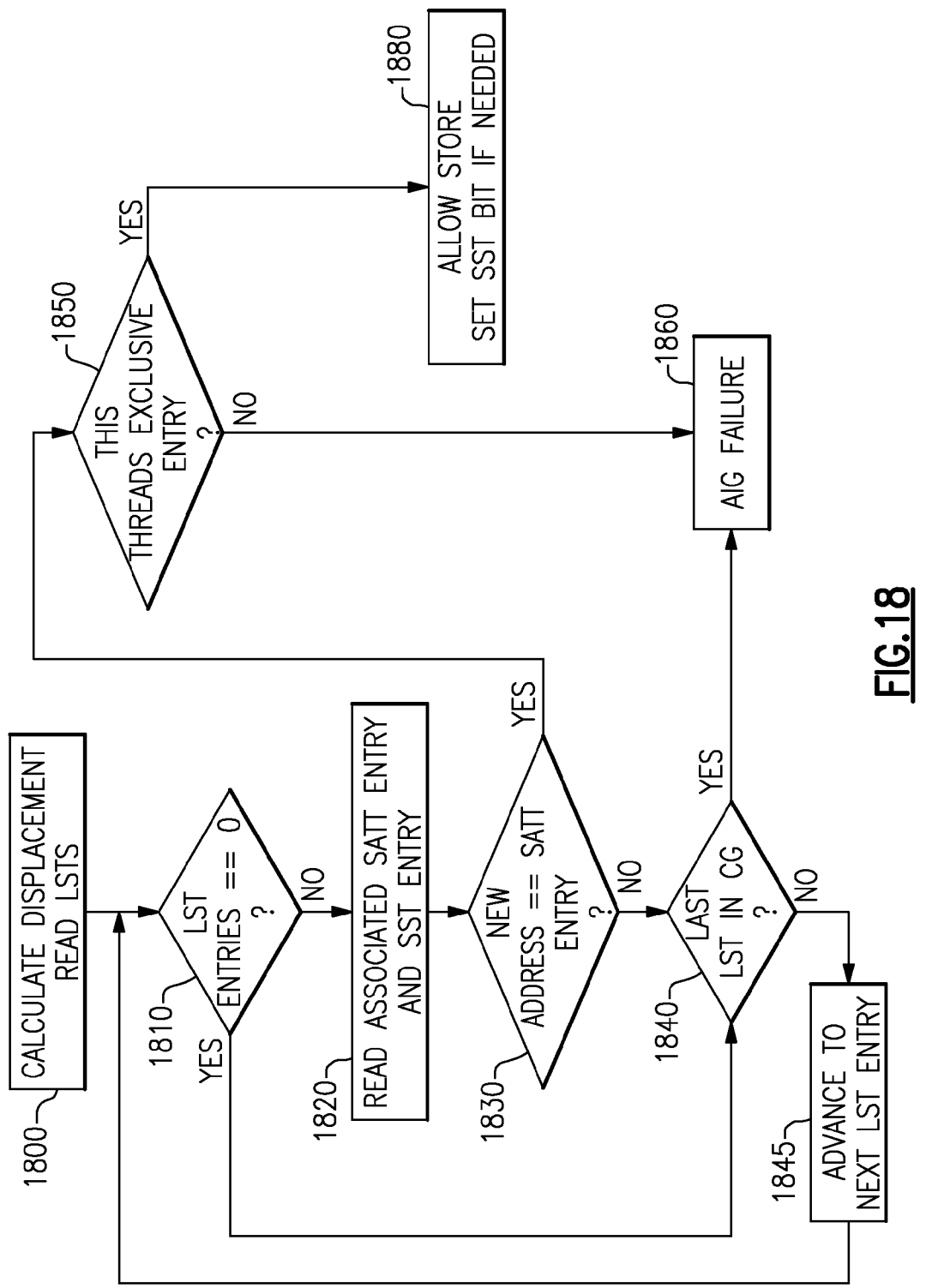
FIG. 18 illustrates

The actions required to create entries in the SATT, LST and SST during the processing of a store request are shown in FIG. 16B. When a processor attempts a store type access a decision (16B00) is made to determine whether the access is part of an AIG and whether the special rules for AIG storage accesses apply. If the special mode of operation is not active then the store is treated as a normal store (16B40). Assuming that an AIG is active, the associated PTRAN bit must be inspected (16B10). If the PTRAN bit is not already set then the PTRAN bit must be set. The LSTs for the 4 threads of the processor are accessed and the bits are read for the corresponding congruence class. If the congruence class is full (16B45) then the transaction must fail (16B46). An SATT congruence class is considered full if all 4 of the SATT entries for that congruence class are already valid. An SATT entry is valid if one or more of the associated LST entries associated with that SATT entry is set. If one or more of the SATT entries in the congruence class is available then the processing of the store access continues (16B50). The PTRAN bit is set and a new entry is added to the Transaction Table. The next available SATT entry in the associated congruence class is written and the corresponding SST bit is set. The LST bit associated with the available SATT entry is set in the appropriate LST (for the hardware thread currently executing the AIG). The address is written to the associated SATT entry using the same index into the table. The "old data" is moved to the Transaction Table entry (242), the address is written to the new transaction table entry (240) and the Tran Info field (241) is updated. The Tran Info field is marked to indicate that the access associated with this entry was a store type access. The new store data is written to memory after the setting of the PTRAN bit is completed. If the inspection of the PTRAN bit (16B10) indicates that the bit was already set then a decision (16B20) is made based on whether the current store address is already part of an AIG active on this thread. This decision can be made by examining the Transaction Table (230) for the current thread. But in accordance with FIG. 18 the combination of the LST and SATT entries are used to quickly determine if the address is part of the current AIG. The additional steps to make this determination are shown in FIG. 18. If the steps shown in FIG. 18 indicate that the address is part of the current AIG then it is determined (16B60) whether the address is enabled to be shared among multiple AIGs. If the Tran Info indicates that the entry is a load type access entry that is shared among multiple AIGs, the transaction fails (16B30) otherwise the Tran Info field for the associated entry is updated to indicate a store type access (16B70), the associated SST entry is set to 1, the "old" data is moved to the associated Transaction Table entry, and the store is processed.

Figure 16C:
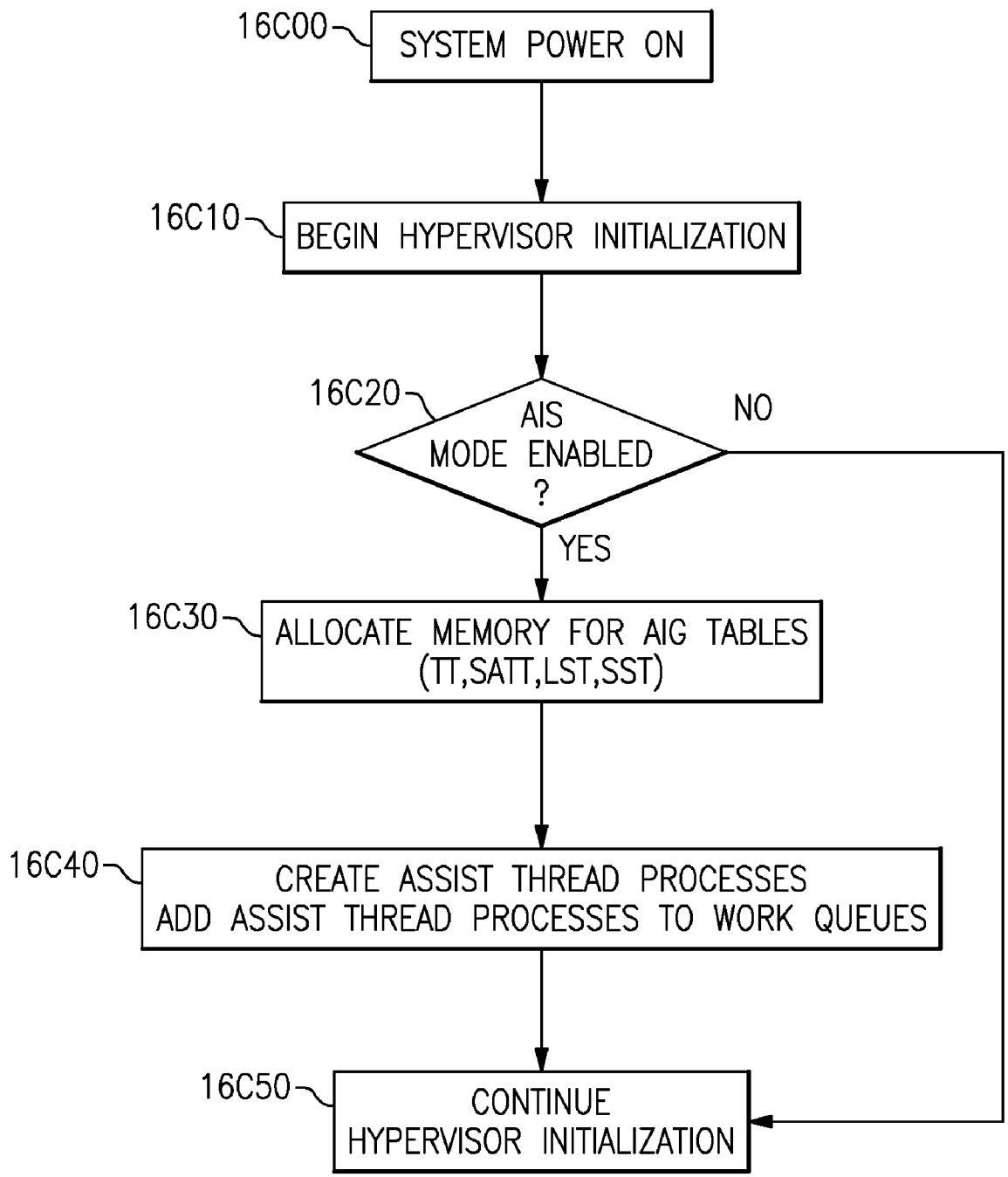
FIG. 16C shows the preferred method of initializing the assist thread and preparing the computing system for the execution of transactions.

FIG. 16C shows the preferred method of initializing the assist thread and preparing the computing system for the execution of transactions. After the system is powered on (16C00) the hypervisor control program is initialized (16C10). The preferred embodiment uses a hypervisor but any suitable operating system could be used. The hypervisor determines whether the system is enabled to execute AIGs (16C20). If AIGs are not supported then the normal initialization of the hypervisor continues (16C50). If AIGs are supported then the hypervisor allocates memory for the AIG tables to be used by the assist thread during the processing of AIGs (16C30). The preferred embodiment uses the hypervisor to allocate the required memory for the AIG tables but other implementations of the current invention may have the assist thread itself allocate the required memory space. The hypervisor then creates the assist thread process itself and adds the assist thread to the work queue (16C40). The preferred embodiment uses one assist thread per microprocessor in the system but other implementations may use multiple assist threads. The number of n assist threads numbering from 1 to n can be different than the number of microprocessors to parallelize the execution of a transaction of the transaction data of said first thread to allow the first thread of execution to continue to a next instruction while utilizing a data buffer for communication between the first thread of execution and the assist thread(s). Multiple assist threads per microprocessor may be useful for systems which expect large numbers of transactions to be used. Other embodiments may use just one assist thread for multiple microprocessors. In the latter case, any suitable means may be used to communicate between a microprocessor executing AIGs and any other microprocessor that is currently running the assist thread. The communication could be achieved via shared memory data structures or traditional multiprocess message passing among many other possibilities. After the assist thread has been created and added to the work queues the initialization of the hypervisor continues (16C50).

FIG. 17 describes detailed steps for a fast and efficient resolution of the common case of an AIG load that inspects the associated PTRAN bit and finds that the bit is already set. The bit may have already been set by another AIG in the system or it may have been set by an earlier action of the current AIG. Both of these cases are common in transactional memory systems. The case of two AIGs loading from a single storage location is commonly referred to as "reader concurrency". This concurrent access must be allowed to achieve high performance on many multithreaded algorithms. The steps shown in FIG. 17 provide this function with high speed, independent of the number of instructions in an AIG. The required displacement into the LST is calculated (1700) by using a portion of the address of the target storage location. The displacement is calculated using the address of the new storage access. In the preferred embodiment 7 bits of the address are used. The value of these 7 bits is multiplied by 4, the set associativity of the preferred embodiment SATT tables, to generate the displacement. The displacement is used to read out the LST entries associated with the first SATT entry in the target congruence class. If all 4 of the LST entries are 0 then it is known that the associated SATT entry is not valid and it is next determined (1740) whether the last set of LSTs for the target congruence class has been reached. If the last congruence class has not been reached then the displacement is incremented (1745) in order to advance to the next set of LST entries associated with the next SATT entry in the congruence class. Processing then continues (1710). When the inspected LST Entries (1710) show that one of the LST bits is set, the associated SATT Entry is read (1720). The target address of the current load is compared to the address saved in the SATT entry. If the address does not match the search of the congruence class continues (1740). If an address match is found additional steps are taken (1750). It is determined if the matching SATT entry is owned by the current thread by inspecting the associated LST entry belonging to the current thread. If the LST entry is set then it is known that the current thread has already been given access to this storage location and the new load is allowed (1760). If it is determined that the current thread does not currently have access to the target storage location it is determined (1755)

whether the SATT entry is a store type entry by inspecting the associated SST entry. If the SST entry is 0 it is known that the associated SATT entry is not a store type entry and therefore the current load can be allowed to share access to the target storage location. The new load is allowed and the associated LST entry for the current thread is set (1760). If the SST entry is 1 the AIG fails (1757) since another AIG has stored into the target location and the rules for transactional memory access prevent other AIGs from accessing this location until the first AIG has finished.

FIG. 18 shows the steps provided by the current invention for a fast and efficient resolution of the common case of an AIG store that inspects the associated PTRAN bit and finds that the bit is already set. The bit may have already been set by another AIG in the system or it may have been set by an earlier action of the current AIG. Both of these cases are common in transactional memory systems. The steps shown in FIG. 18 provide the required function with high speed, independent of the number of instructions in an AIG. The required displacement into the LSTs is calculated (1800) by using a portion of the address of the target storage location. The displacement is used to read out the LST entries associated with the first SATT entry in the target congruence class. If all 4 of the LST entries are 0 then it is known that the associated SATT entry is not valid and it is next determined (1840) whether the last set of LSTs for the target congruence class has been reached. If the last congruence class has not been reached then the displacement is incremented (1845) in order to advance to the next set of LST entries associated with the next SATT entry in the congruence class. Processing then continues (1810). When the inspected LST entries (1810) show that one of the LST bits is set, the associated SATT Entry and SST Entry are read (1820). The target address of the current store is compared to the address saved in the SATT entry. If the address does not match the search of the congruence class continues (1840). If an address match is found additional steps are taken (1850). It is determined if the matching SATT entry is owned exclusively by the current thread by inspecting the associated LST entries belonging to all the threads in the system. If no LST entries for any other thread in the system is set then it is known that the current thread has already been given exclusive access to this storage location and the new store may be allowed (1880). The store is not allowed if it is determined that other AIGs belonging to other threads have been given access to the target storage location. If the Last LST in the congruence class is inspected (1840) and no matching SATT address has been found anywhere in the target congruence class, it can be assumed that the current thread did not set the PTRAN bit and that it must have been set by another thread, and so, in this case, the AIG fails (1860).

Figure 19:
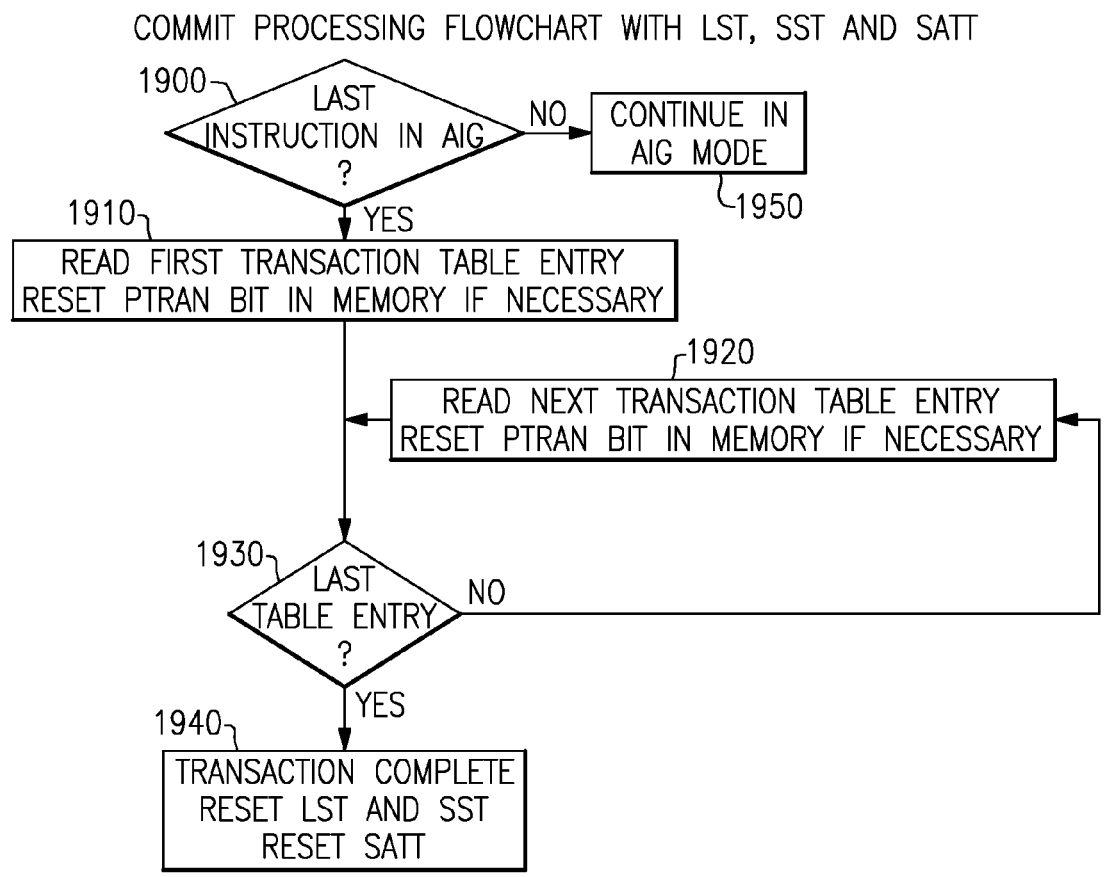
FIG. 19 illustrates the processing steps for committing an AIG.

FIG. 19 shows the processing steps for committing an AIG. It is first determined whether the last instruction in an AIG has been reached (1900). If all of the instructions of an AIG have not been processed then the processor continues in the AIG mode (1950). If all of the instructions of an AIG have been processed successfully then the first entry of the Transaction Table is read. The PTRAN bit is reset (1910). It is determined whether the Transaction Table entry is the last valid entry in the table (1930), if not then the next entry is read (1920) and the PTRAN bit associated with that entry is reset. Processing of the Transaction Table entries continues until all of the associated PTRAN bits have been reset and the last table entry is reached. After the PTRAN bit for the last valid entry of the Transaction Table is reset, additional actions are required (1940). All of the entries of the associated LST, SST are reset, this invalidates the associated SATT entries. The resetting of the LST and SST may be done in parallel by additional threads of execution or with the help of hardware assist engines. An alternate implementation may create a new LST, SST and SATT in memory that has already been cleared and adjusting pointers that track the origins of each of the tables.

Figure 20:
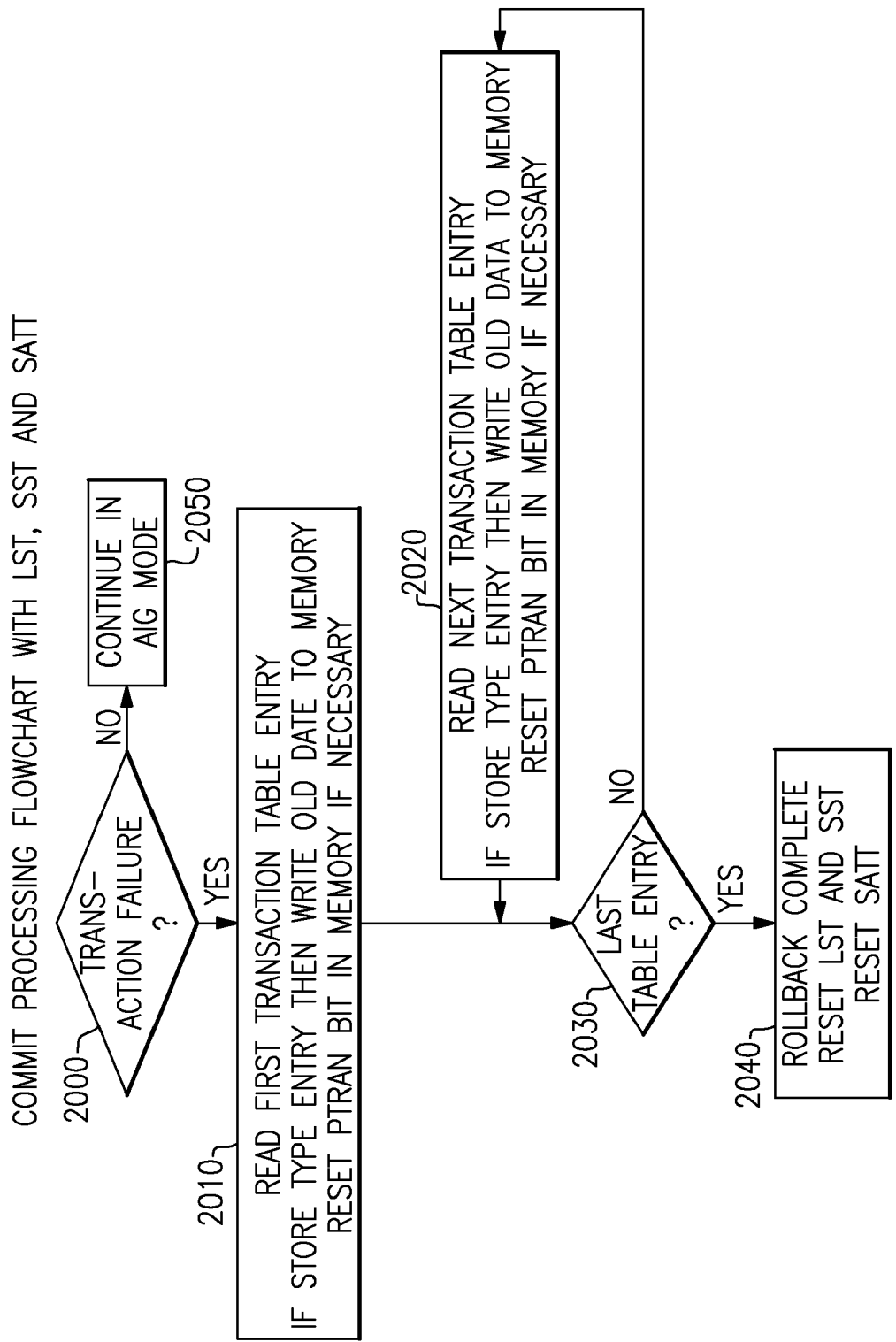
FIG. 20 illustrates processing steps for rollback.

FIG. 20 shows the processing steps for rollback. First it is determined whether a failure has occurred during the processing of an AIG (2000). Instruction processing continues in the AIG mode while no failures are detected. If a failure is detected then rollback processing begins (2010). The first valid entry of the Transaction Table for the thread of execution is read. If the Tran Info field of the Transaction Table indicates that the entry is a store type entry then the data in the "old data" field is written to memory at the target address. The PTRAN bit for the associated entry is reset. It is determined whether the Transaction Table entry is the last valid entry in the table (2030), if not then the next entry is read (2020), the old data is written to memory if necessary and the PTRAN bit associated with that entry is reset. Processing of the Transaction Table entries continues until the last table entry is reached. After the PTRAN bit for the last valid entry of the Transaction Table is reset, additional actions are required (2040). All of the entries of the associated LST, SST and SATT are reset (2040). The resetting of the LST, SST and SATT may be done in parallel by additional threads of execution or with the help of hardware assist engines. An alternate implementation may create a new LST, SST and SATT in memory that has already been cleared and adjusting pointers that track the origins of each of the tables.

As stated in the original application, a PTRAN bit is provided for each increment of real storage in the computing system. The preferred embodiment of the current invention uses a storage increment of 16 bytes (QW), each PTRAN bit is associated with one QW of real storage. Other implementation may use a larger increment such as 128 Bytes. Some implementations may also provide faster access and checking on PTRAN bits that are buffered in data caches. It may be beneficial for those systems to provide a storage increment granularity for the PTRAN bit that is 128 Bytes or 64 Bytes in order to match the line size of the cache. This may also provide the method of adding transactional memory support to existing systems that requires the fewest design changes and the lowest overall complexity in some cases. Systems that provide PTRAN bit buffering in this manner may still use the current invention to provide the illusion of a smaller storage increment than that used for the buffering. In one possible example a QW storage increment granularity can be tracked in the SATT entries at the same time that the L2 cache hardware provides a 128 Byte storage increment granularity at the L2 cache level.

Some implementations of the current invention may also include hardware or a combination of hardware and software that eliminates the need to provide a hardware PTRAN bit for every increment of real memory but still provides the illusion that the PTRAN bit exists for every increment. This may be beneficial to systems where the hardware cost of providing a PTRAN bit per increment is too high.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided embodied in a physical media.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A multithreaded microprocessor comprising:

a microprocessor forming a Central Electric Complex (CEC) of a computer system having a plurality of cores each having a hardware transactional memory for supporting a plurality of hardware threads for supporting hardware transactional memory operations and for detecting conflicts between storage accesses of transactions running on multiple threads of execution in a multithreaded operation, as well as for supporting normal operations with instruction execution pipelines, said computing system having an operation control means for transforming the computer system to use assist thread operations by initializing one or more assist threads in said multithreaded operation and preparing the computing system for the execution of transactions using a storage element for storing an address history table (AHT) to the hardware register file of the multithreaded microprocessor having entries for a storage access written in a hardware register array for said AHT by load store units of said microprocessor, said computer system having a plurality of interfaces for command and control information written into the AHT from said instruction execution pipelines and having a general purpose register coupled to at least one assist thread interface that carries command, control, address and data information for copying and moving entries in said AHT to parallelize the execution of a transaction of the transaction data of a first thread to allow the first thread of execution to continue to a next instruction while utilizing a data buffer for communication between the first thread of execution and all assist threads;

wherein an AHT entry contains an "Entry Type" field, an Access Type field, an "Address" field, a "Thread ID" field, and a "Response" field, and wherein Entry Type fields of AHT entries contain specialized commands and Address Record entries, and the Access Type field will contain an indication of whether the address was from a store type access or a load type access, the "Address" field contains the real address of the storage access, the "Thread ID" field indicates the thread of execution that is processing an AIG and which caused the entry in the AHT to be created, and the "Response" field is used to associate hardware responses to AHT entries where responses may indicate that steps required during the processing of addresses stored in the AHT have been completed.

2. The multithreaded microprocessor according to claim 1 wherein an AHT entry contains an "Entry Type" field, an Access Type field, an "Address" field, a "Thread ID" field, and a "Response" field, and wherein Entry Type fields of AHT entries contain specialized commands and Address Record entries.

3. The multithreaded microprocessor according to claim 2 wherein said Address Record entries contain an indication of whether the address was from a store type access or a load type access for a specific Address Record entry.

4. The multithreaded microprocessor according to claim 2 wherein for an entry in said AHT the Access Type field will contain an indication of whether the address was from a store type access or a load type access.

5. The multithreaded microprocessor according to claim 2 wherein for an entry in said AHT the "Address" field contains the real address of the storage access.

6. The multithreaded microprocessor according to claim 2 wherein for an entry in said AHT the "Thread ID" field (1040) indicates the thread of execution that is processing an Atomic Instruction Group (AIG) and which caused the entry in the AHT to be created.

7. The multithreaded microprocessor according to claim 2 wherein for an entry in said AHT the "Response" field is used to associate hardware responses to AHT entries which indicate that steps required during the processing of addresses stored in the AHT have been completed.

8. The multithreaded microprocessor according to claim 2 wherein for an entry in said AHT the response field is a single bit for one response or multiple bits used to represent multiple responses or multiple stages when a series of responses are required.

9. The multithreaded microprocessor according to claim 1 wherein an AHT entry is a hardware register file and said microprocessor supports plural simultaneous threads.

10. A method for use by a transaction program on a computing system having a plurality of microprocessor cores having a hardware transactional memory for managing memory access to a shared memory location for transaction data of a first thread, the shared memory location being accessible by the first thread and a second thread, the method comprising:

supporting normal operations on said computer system with instruction execution pipelines whereby a plurality of said cores support a plurality of hardware threads for supporting normal operations and hardware transactional memory operations, transforming said normal operations and hardware transactional memory operations to parallelize operations transforming the computer system to use assist threads and hardware transactional memory operations and for detecting conflicts between storage accesses of transactions running on multiple threads of execution in a multithreaded operation by initializing one or more assist threads and preparing the computing system for the execution of transactions using a storage element for storing an address history table (AHT) having entries for a storage access written in the hardware register file of the multithreaded microprocessor for said AHT by load store units of microprocessor cores to parallelize the execution of a transaction of the transaction data of a first thread to allow the first thread of execution to continue to a next instruction while utilizing a data buffer for communication between the first thread of execution and assist thread(s), executing a string of instructions to complete a transaction of said first thread, beginning with one instruction of said string of instructions, and determining whether said one instruction is part of an active atomic instruction group (AIG) of instructions associated with said transaction of said first thread, and if said one instruction is part of an active AIG, locating a transaction table which provides for entries in an active mode for said AIG wherein all storage locations inspected or modified by instructions of said active AIG remain pending until the computing system's hardware transactional memory indicates that the storage locations should be committed, and if said one instruction is not part of an active AIG, then executing a next instruction under normal execution mode;

using address history tables (AHTs) having entries for a storage access written in said AHTs by load store units of said computing system, and supporting said first thread with said assist thread and accessing one of said AHTs with said assist thread while supporting the execution of a number of AIGs which are running on other threads of execution; and using one AHT per thread.

11. The method for use by a transaction program on a computing system according to claim 10 including using an address history table (AHT) having entries for a storage access written in said AHT by load store units of said computing system, and supporting said first thread with said assist thread and accessing said AHT with said assist thread while supporting the execution of a number of AIGs which are running on other threads of execution.

12. The method for use by a transaction program on a computing system according to claim 11 wherein if an AIG is active, the assist thread determines whether there is a valid entry in the AHT.

13. The method for use by a transaction program on a computing system according to claim 12 wherein if no entry in the AHT is valid the assist thread waits for N cycles before checking again.

14. The method for use by a transaction program on a computing system according to claim 13 wherein the value N is predetermined at an earlier time to be set at an optimal value.

15. The method for use by a transaction program on a computing system according to claim 11 wherein a valid AHT entry is read out of the AHT by the assist thread and moved to general purpose registers that are made available and a Thread ID field is used to determine a thread of execution that created said AHT entry and to determine which one of a set of AIG Transaction Tables must be updated.

16. The method for use by a transaction program on a computing system according to claim 11 wherein if an AIG is active then it is determined if the load store unit is processing a store request, and then if a store is being processed by the load store unit then the request is held waiting for the assist thread to complete processing of an associated address and until a PTRAN bit for the associated address has been set by actions of the assist thread.

17. The method for use by a transaction program on a computing system according to claim 11 wherein in parallel with an AIG active decision, another decision is made by the load store unit each cycle as it is determined whether the instruction pipeline of the microprocessor indicates that a store should be released, and if a store is to be released it is determined whether the load store unit is currently holding a store that has an address that matches the address of the store to be released, and if the addresses match then the store is released, but if the addresses do not match then no action is taken regarding the held stores and the load store unit waits for another indication that a store is to be released.

18. A method for use by a transaction program on a computing system having a plurality of microprocessors for managing memory access to a shared memory location for transaction data of a first thread, the shared memory location being accessible by the first thread and a second thread, the method comprising:

supporting normal operations on said computer system with instruction execution pipelines whereby a plurality of said cores having hardware transactional memory support for a plurality of hardware threads for supporting normal operations and hardware transactional memory operations, transforming said normal operations and hardware transactional memory operations and for detecting conflicts between storage accesses of transactions running on multiple threads of execution in a multithreaded operation to parallelize operations and transforming the computer system to use assist thread operations in said multithreaded operation by providing n assist threads numbering from 1 to n, the number of which assist threads can be different than the number of microprocessors, and initializing one or more assist threads and preparing the computing system for the execution of transactions using a storage element for storing an address history table (AHT) having entries for a storage access written in the hardware register file of one of the multithreaded microprocessors for said AHT by load store units of one of the microprocessor cores to parallelize the execution of a transaction of said transaction data of said first thread to allow said first thread of execution to continue to a next instruction while utilizing a data buffer for communication between the first thread of execution and an assist thread, and executing a string of instructions with said microprocessors to complete a transaction using hardware transactional memory of said first thread, beginning with one instruction of said string of instructions;

wherein one or more assist threads are provided by initializing the assist thread and preparing the computing system for the execution of transactions, and wherein an operating system control program determines whether said computing system is enabled to execute an active atomic instruction group (AIG) of instructions associated with said transaction of said first thread, and if AIGs are supported then the operating system control program allocates memory for AIG tables to be used by the assist thread during the processing of AIGs, or said assist thread allocates the required memory space, and then the operating system control program creates the assist thread process itself and adds the assist thread to the work queue of the computing system.

19. The method according to claim 18 wherein one or more assist threads are provided by initializing the assist thread and preparing the computing system for the execution of transactions.

* * * * *